United States Patent [19]

Ninomiya et al.

[11] 4,379,333

[45] Apr. 5, 1983

[54] METHOD AND SYSTEM FOR OPERATING A POWER-PRODUCING MACHINE AT MAXIMUM TORQUE UNDER VARYING OPERATING CONDITIONS

[75] Inventors: Masakazu Ninomiya; Atsushi Suzuki, both of Kariya; Yuji Hirabayashi, Aichi, all of Japan

[73] Assignee: Nippondenso Co., Ltd., Kariya, Japan

[21] Appl. No.: 159,435

[22] Filed: Jun. 13, 1980

[30] Foreign Application Priority Data

Aug. 29, 1979 [JP] Japan .................................. 54-110939
Feb. 7, 1980 [JP] Japan .................................. 55-14605

[51] Int. Cl.³ .......................... F02P 5/08; F02B 5/02; G05B 13/02
[52] U.S. Cl. ............................... 364/431.05; 123/417; 123/419; 364/158; 364/431.04
[58] Field of Search ................... 364/442, 158, 431.04, 364/431.05; 123/415, 416, 417, 418, 419

[56] References Cited

U.S. PATENT DOCUMENTS

| | | | |
|---|---|---|---|
| 4,009,699 | 3/1977 | Hetzler et al. | 364/431.04 X |
| 4,026,251 | 5/1977 | Schweitzer et al. | 123/419 X |
| 4,130,863 | 12/1978 | Schweitzer et al. | 364/431 X |
| 4,153,019 | 5/1979 | Laubenstein et al. | 123/415 X |
| 4,236,214 | 11/1980 | Sasayama | 364/431.04 |
| 4,266,518 | 5/1981 | Nishida et al. | 123/416 |
| 4,268,910 | 5/1981 | Omori et al. | 364/431.08 |

*Primary Examiner*—Felix D. Gruber
*Attorney, Agent, or Firm*—Cushman, Darby & Cushman

[57] ABSTRACT

Spark ignition timing of an internal combustion engine is oscillated on opposite sides of the setting of a variable reference timing and the resultant engine speed is detected in at least three successive phases of the oscillation and stored in respective memories. The contents of the memories are compared with each other to detect whether they establish one of two predetermined relationships which occur exclusively in the absence of a manual command input to the engine. The variable reference setting is adjusted by a predetermined amount in a specified direction in response to the established relationship. The process is repeated so that the reference setting approaches an optimum advance angle at which the engine output torque is at a maximum. When the reference setting is at or near the optimum point or when a manual command engine input is present, the registered engine speed values establish a relationship other than the predetermined ones and the reference setting is not adjusted.

23 Claims, 32 Drawing Figures

(CRANKSHAFT GEAR INTERRUPT ROUTINE)

FIG. 19 (PROGRAM INTERRUPT ROUTINE) 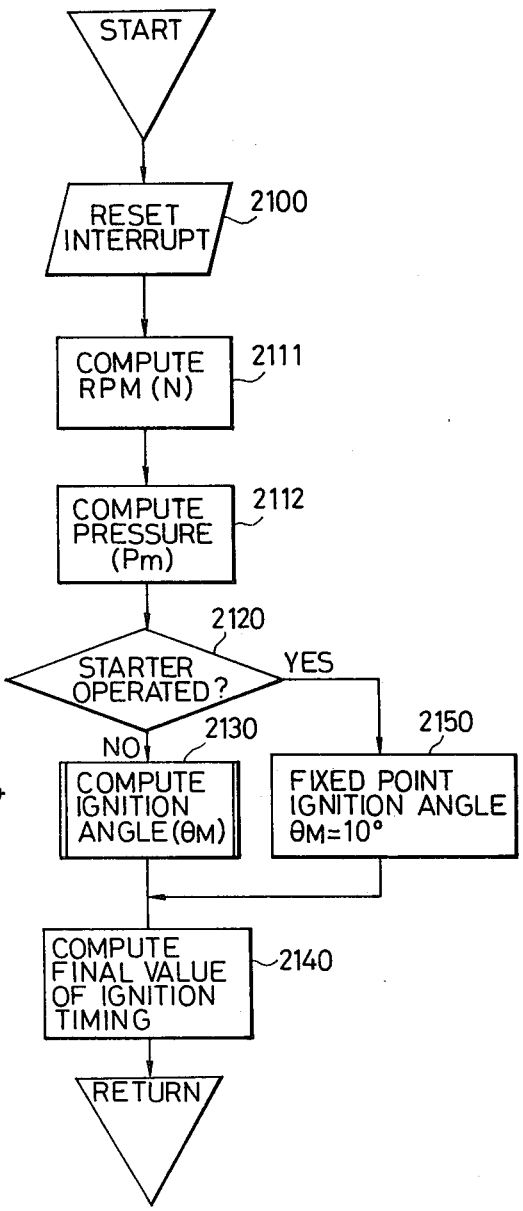

FIG. 24

| RPM (S) | 500 | 600 | 700 | 800 | 900 | 1000 | 1500 | 2000 | 2500 | 3000 | 3500 | 4000 | 4500 | 5000 | 5500 | 6000 |
|---|---|---|---|---|---|---|---|---|---|---|---|---|---|---|---|---|
| X | 0 | 1 | 2 | 3 | 4 | 5 | 6 | 7 | 8 | 9 | 10 | 11 | 12 | 13 | 15 | 15 |

| PRS (Pm) | Y | | | | | | | | | | | | | | | | |
|---|---|---|---|---|---|---|---|---|---|---|---|---|---|---|---|---|---|
| 85 | 0 | | | | | | | | | | | | | | | | |
| 130 | 1 | | | | | | | | | | | | | | | | |
| 175 | 2 | | | | | | | | | | | | | | | | |
| 220 | 3 | | | | | | | | | | | | | | | | |
| 265 | 4 | | | | | | | | | | | | | | | | |
| 310 | 5 | | | | | | | | | | | | | | | | |
| 355 | 6 | | | | | | | | | | | | | | | | |
| 400 | 7 | | | | | | | | | | | | | | | | |
| 445 | 8 | | | | | | | | | | | | | | | | |
| 490 | 9 | | | | | | | | | | | | | | | | |
| 535 | 10 | | | | | | | | | | | | | | | | |
| 580 | 11 | | | | | | | | | | | | | | | | |
| 625 | 12 | | | | | | | | | | | | | | | | |
| 670 | 13 | | | | | | | | | | | | | | | | |
| 715 | 14 | | | | | | | | | | | | | | | | |
| 760 | 15 | | | | | | | | | | | | | | | | |

(8-ms INTERRUPT)

(MAIN ROUTINE)

METHOD AND SYSTEM FOR OPERATING A POWER-PRODUCING MACHINE AT MAXIMUM TORQUE UNDER VARYING OPERATING CONDITIONS

BACKGROUND OF THE INVENTION

The present invention relates to a method and system for operating a power-producing machine at maximum output torque under varying operating conditions. The invention is particularly suitable for operating an internal combustion engine at maximum output torque by oscillating the setting of ignition timing on opposite sides of a reference setting.

In so far as the knocking and exhaust gas emission problems do not significantly affect engine performance, spark ignition timing is usually controlled in response to engine variables (such as engine crankshaft speed and intake vacuum) so that a maximum amount of torque is delivered and fuel consumption rate is kept at a minimum. However, due to the difficulties encountered in calibrating the engine to its particular operating characteristics during the manufacturing stage, spark ignition advance setting is not necessarily adjusted to an optimum value for that particular engine. Even if such calibration is successfully achieved, the operating characteristics of the engine tend to vary as a function of environmental conditions (temperature, altitude, etc.) and as a function of aging, and therefore, the particular spark ignition setting would cease to be the optimum setting.

Attempts have been made to overcome this problem. U.S. Pat. No. 3,142,967 granted to Paul H. Schweitzer discloses a spark ignition control system in which spark ignition timing is continuously dithered or oscillated to either side of a reference advance timing to detect the resultant variation in an engine output variable such as engine speed at two consecutive points in time. The reference advance timing is corrected in one way or another in response to the result of a comparison between the detected output engine variables. More specifically, if the engine speed variation in response to an ignition timing dithered in the direction of advance with respect to the reference timing, is greater than the engine speed variation in response to an ignition timing dithered in the direction of retard with respect to that reference, the reference setting is corrected toward the advance side by a predetermined amount. If the former is smaller than the latter, the correction is made in the opposite direction.

Since the engine output variable is sensed at two points in time, there are only two possible relations or "permutations" in which the detected output engine variables occur in the order of magnitude. Therefore, upon manual command acceleration or deceleration, the detected output engine variables do not serve as a valid indication for purposes of correcting the reference advance setting. Otherwise stated, the prior art method is incapable of discriminating the engine output power variations resulting from the manual command from those variations resulting from the constant oscillation of the input variable, or spark ignition setting.

SUMMARY OF THE INVENTION

Accordingly, the primary object of the invention is to overcome this problem by oscillating the setting of an input engine variable with respect to a variable reference setting, sensing an output variable representing the output power of the engine in response to at least three successive phases of the oscillation, and correcting the reference setting according to relationships established by the sensed variables.

Because of the detection of the output variables at three successive phases, there is a maximum of six possible permutations in which the detected output variables occur in different orders depending on varying operating conditions. According to an embodiment of the invention, spark ignition repeatedly occurs the same number of times during each period of three successive ignition phases of a recurrent feedback cycle. In a reference or basic ignition phase, spark angle is adjusted to a variable reference setting and in subsequent advance and retard ignition phases, spark advance angle is respectively advanced and retarded with respect to the reference setting by a predetermined amount. During the period of each ignition phase, preferably during a short interval immediately prior to a transition from one phase to another, the engine speed is detected and registered in respective memories, and at the end of each feedback cycle, the registered engine speed values are compared with each other to detect whether they establish one of two specified relationships which would occur if no manual command engine input has occurred during that feedback cycle.

If the reference setting in each feedback cycle is on the retard side of an optimum setting at which the engine output torque is at a maximum, the registered engine speed values establish a relationship in which the advance phase engine speed is of the highest value and the retard phase engine speed is of the lowest value. Conversely, if the reference setting is on the retard side of the optimum setting, the relationship is reversed so that the retard phase engine speed is of the highest value and the advance phase engine speed is of the lowest value.

The reference setting is corrected by a predetermined amount in a specified direction at the end of each feedback cycle in response to the established relationship. This correction process is repeated during subsequent feedback cycles so that the reference setting approaches the optimum point. When the reference setting is at or near the optimum point, or when the engine is accelerated or decelerated upon manual command, the registered engine speed values establish a relationship other than the predetermined ones and no correction is made to the reference setting.

A microcomputer is advantageously employed for practicing the concept of the present invention by programming it to perform various routines including different priority level interrupt routines which are executed during a running main routine. The reference advance setting is represented by digital data which are derived by correlation between intake manifold pressure and engine speed which are periodically detected in the top priority level interrupt routine. The reference setting data is stored in a random access memory in the form of an array of rows and column, or map. A feedback control area is defined around each data point of the random access memory and periodically interrogated in a medium priority level interrupt routine to check to see if subsequently detected engine speed and intake pressure values correspond to a data point which lies outside of the defined area, and if so, a new feedback control area is established around the subsequently generated data. The number of occurrences of the feedback control area is counted to determine which one of the feedback control areas most frequently occurred in one feedback cycle, and if the count indicates that the most frequently occurred area falls short of a predetermined percentage of the total number of ignitions within that cycle, the reference setting data is left uncorrected. Each ignition phase is identified by a particular dither flag (−1, 0 or 1) and the central processing unit (CPU) places a dither angle data corresponding to the dither flag and calculates an advance or retard angle data by adding the dither angle data to the reference data and causes ignition to occur in the top priority level interrupt routine. The engine speed detected in each ignition phase is represented by the number of clock pulses which occur during an interval immediately prior to the time the ignition phase shifts to the next.

The feedback control area is checked against an inhibit map to disable the feedback correction if ignition at the optimum point would cause misfire or knocking when the engine is idled or run at heavy load, respectively.

BRIEF DESCRIPTION OF THE DRAWINGS

The features and advantages of the present invention will become apparent from the following description when read in conjunction with the accompanying drawings, in which:

FIG. 19 is an illustration of a flowchart of program interrupt routine;

FIG. 24 is an illustration of a set of reference angle data stored in an array of rows and columns within a random access memory of FIG. 5;

DETAILED DESCRIPTION

Figure 1:
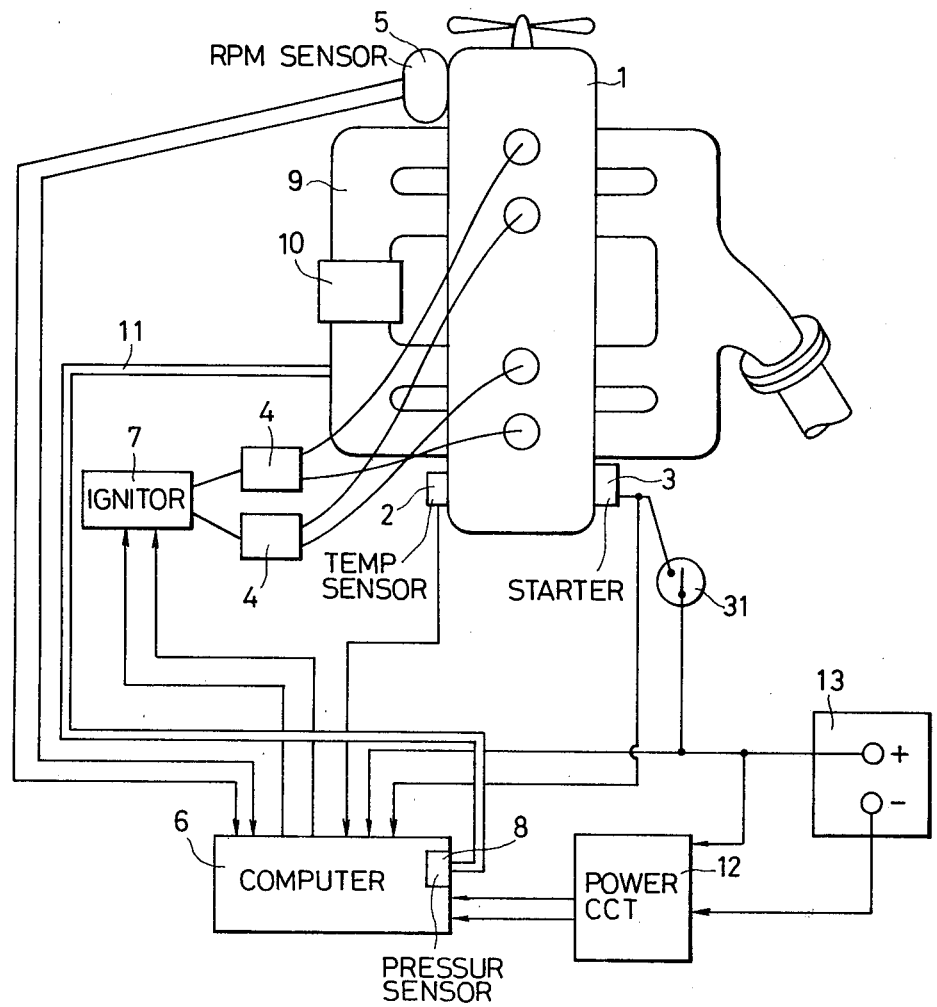
FIG. 1 is a schematic block diagram of the control system of the invention.

In FIG. 1 the ignition control system of the present invention for an internal combustion engine is schematically illustrated. Reference numeral 1 is a four-cylinder internal combustion engine having an intake manifold 9 and a carburetor 10. An engine coolant temperature sensor 2 and a crankshaft revolution sensor 5 are provided to sense the respective engine operating variables and supply their signals to a computer 6. The crankshaft revolution sensor 5 is a device which generates a reference pulse in response to an engine piston reaching its top dead center and successively angular position pulses at predetermined crankshaft angular intervals (30 degrees, for example). The engine is started by a starter 3 in response to a switch 31 with a current supplied from a battery 13 in the conventional manner. An ignitor or ignition amplifier 7 receives control signals from the computer 6 and activates twin ignition coils 4 which supply high ignition voltages to respective spark plugs within the engine cylinders in appropriate order in a well known manner. An intake pressure sensor 8, included in the computer 6, is connected to the intake manifold 9 via a conduit 11 to detect the pressure therein.

The computer 6 operates on the crankshaft angular position pulses to detect the engine speed (rpm) and operates on the detected intake pressure to derive ignition control signals at appropriate timing as will be described fully below. The computer 6 also receives a voltage signal from the battery 13 to detect its potential variations and an engine start signal from the switch 31 to vary the ignition timing in response to these input variables. The computer receives its power from a power circuit 12 connected to the battery 13.

A first preferred embodiment of the invention will now be described with reference to a flowchart shown in FIG. 2 taken in conjunction with a timing diagram shown in FIG. 3.

Figure 2:
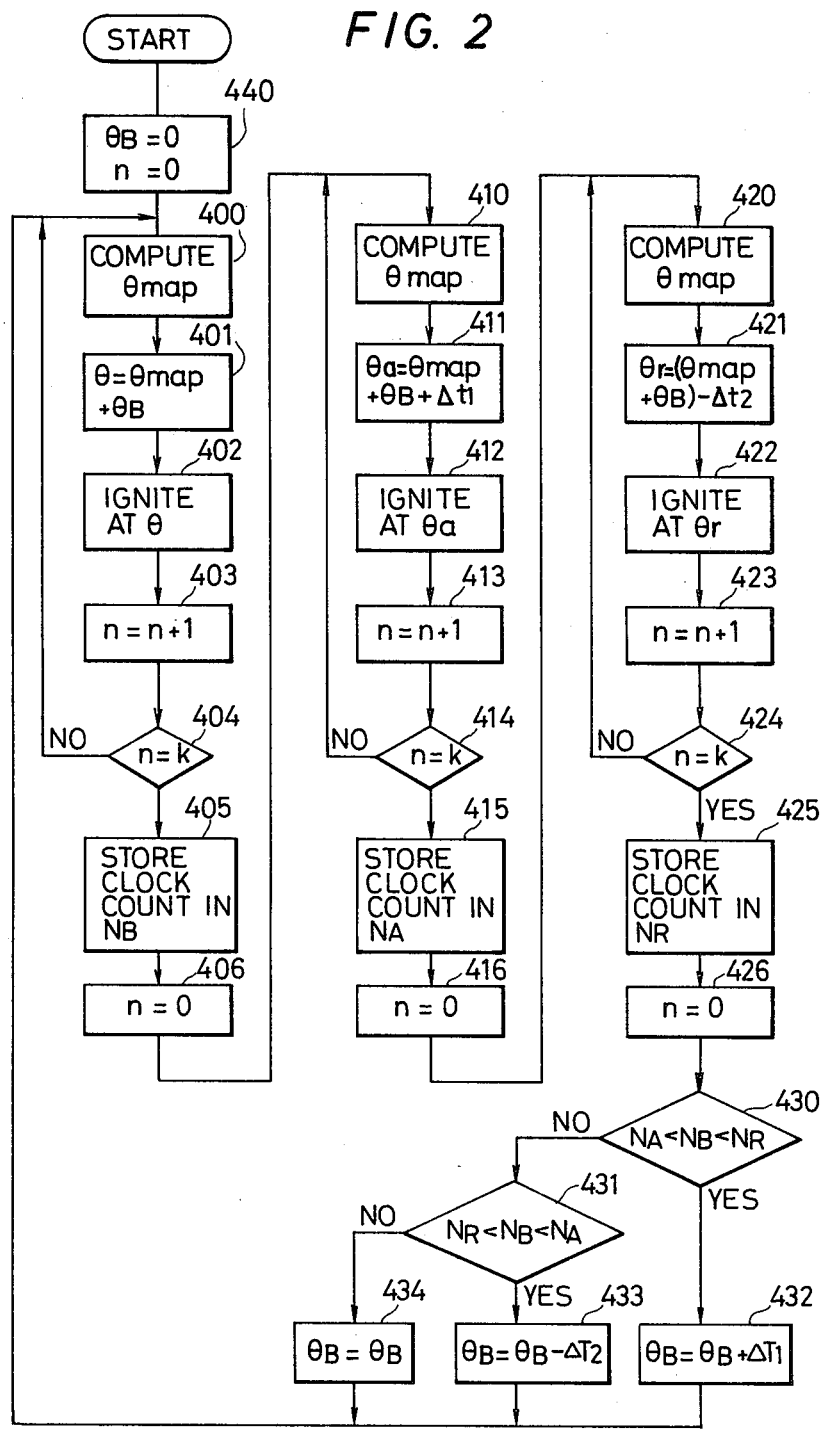
FIG. 2 is an illustration of a flowchart of programmed sequences executed by the computer of FIG. 1.
Figure 3:
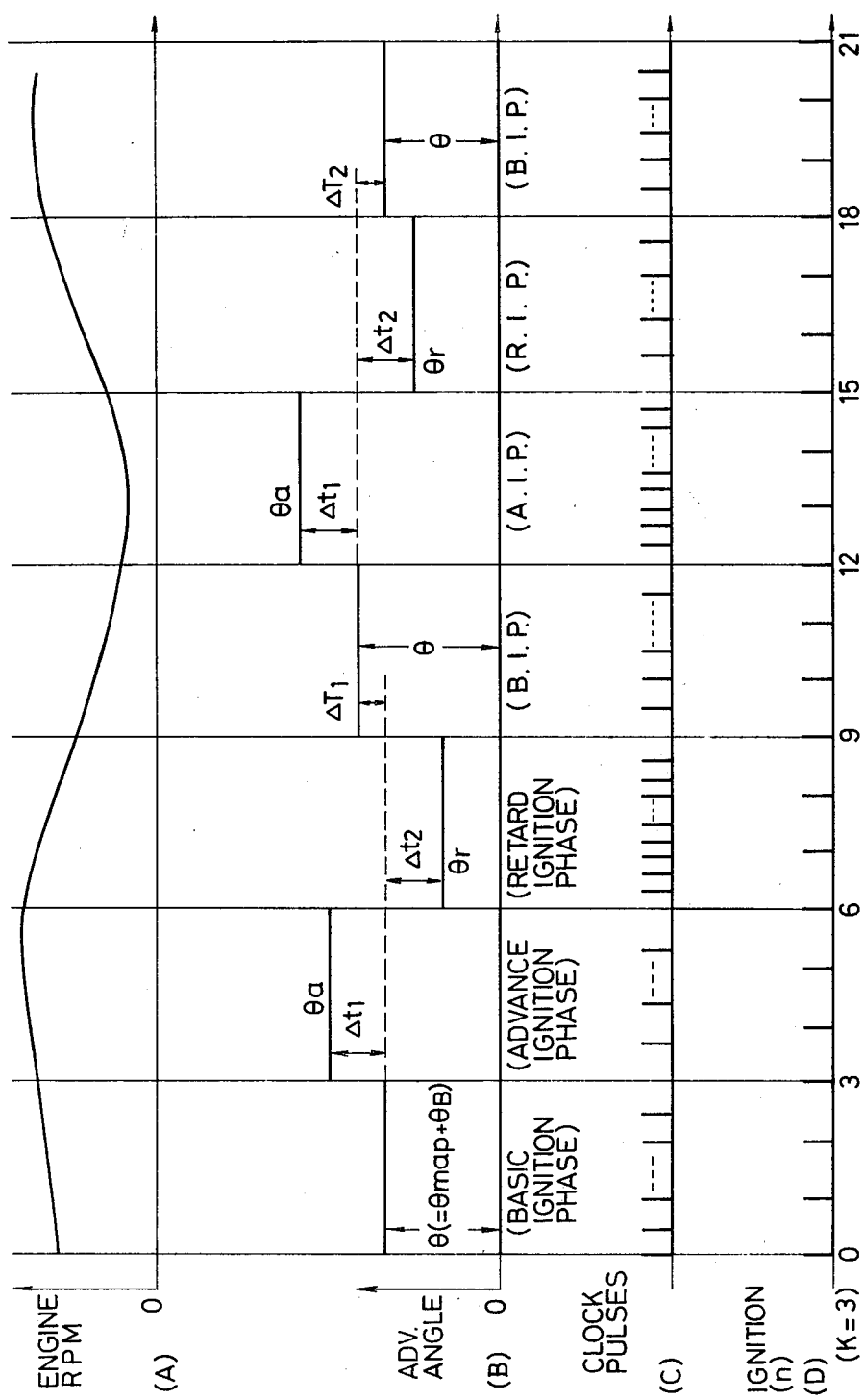
FIG. 3 is an illustration of a timing diagram useful for describing the operation of the ignition control system of the invention.

A spark timing control program of the invention shown in FIG. 2 starts when the engine 1 starts operating and proceeds to step 440 wherein the correction advance angle $\theta_B$ is reset to zero while at the same time resetting a counter which counts the number of spark instants. In the next step 400 the computer operates on the sensed variables from the crankshaft revolution sensor 5 and pressure sensor 8 to derive a basic advance angle $\theta_{map}$, the latter being placed in storage by a write operation in a map format to establish a one-to-one correspondence between the sensed engine revolutions and the sensed intake pressures in the conventional manner. In step 401 the computer seeks a reference advance angle $\theta$ by performing the calculus operation of addition $\theta_{map}$ plus $\theta_B$ and then proceeds to step 402 in which it generates a control signal or spark timing signal based on the reference advance angle data $\theta$. In step 403, the number of spark instants "n" is incremented by "1". The control next goes to step 404 to check to see if the number "n" has reached a predetermined value "k" and if not, it follows a loop to repeat the above steps until the count value "n" becomes equal to "k". In this embodiment, the k value is a decimal "three" (see FIG. 3D). When the event n=k is detected in step 404, the control goes to step 405 wherein a count value $N_B$ representing the number of clock pulses during the period of "k" sparks instants is placed in storage. In other words, the count value $N_B$ represents the interval between successive ones of these "k" spark instants. In step 406 the count value "n" is reset to zero, completing a basic ignition phase which corresponds to the interval between n=0 and n=3 as illustrated in FIG. 3D. During this basic ignition phase the engine is operated with the reference angle $\theta$ before top dead center (BTDC) as seen from FIG. 3B.

Next, the program proceeds to step 410 in which a new reference angle $\theta_{map}$ is derived again in response to the engine input variables as in step 400 and goes to step 411 where a new advance angle $\theta_a$ is derived by adding up $\theta_{map}$, $\theta_B$ and $\Delta t_1$. The advance angle data $\theta_a$ is used in the next step 412 to provide ignition and in step 413 the spark instant count value "n" is incremented by "1", which is then followed by step 414 to repeat the above steps 410 to 413 until n=k is obtained. In step 415 clock count $N_A$ during the "k" instants is placed in storage and then the count is reset to zero in the next step 416, thus completing an advance ignition phase which corresponds to the interval between n=3 n=6 (FIG. 3D).

The advance ignition phase is followed by a retard ignition phase which commences with step 420 wherein the basic advance angle $\theta_{map}$ is again derived in response to the engine input variables as in the previous ignition phases. In the next step 421 a new advance angle $\theta_r$ is derived by adding the correction angle $\theta_B$ to the basic angle $\theta_{map}$ and subtracting from it a predetermined amount $\Delta t_2$, so that in step 422 the ignition system is caused to generate a spark at an instant which is retarded by an amount $\Delta t_2$ with respect to the reference ignition instant or angle $\theta$. Subsequently, steps 423 and 424 are successively executed to repeat the steps 420 to 424 until n=k is obtained in step 424 whereupon a clock count value $N_R$ is placed in storage in step 425, which is followed by the step 426 to reset the count to zero, thus completing the retard ignition phase corresponding to the interval between n=6 and n=9.

The program sequence next enters a step 430 for making comparisons between the stored count values $N_B$, $N_A$ and $N_R$ to detect if they establish a predetermined relationship. More specifically, if the reference spark instant $\theta$ is on the retard side of an optimum spark instant (see FIG. 4), or minimum spark advance for best torque $\theta_M$ (MBT) at which the engine torque is at a maximum provided that there is no variation in the engine input variables at this particular instant, the count values $N_B$, $N_A$ and $N_R$ establish the following relationship therebetween:

$$N_R > N_B > N_A$$

Since the engine speed is reciprocal to the count value, the engine speed values represented by the stored counts establish the following relationship:

$$a/N_R < a/N_B < a/N_A$$

where a is a constant. This relationship is detected in step 430 to give an indication that the reference spark timing $\theta$ is on the retard side of the MBT point $\theta_M$. The CPU 60 then proceeds to step 432 to add $\Delta T_1$ to the correction angle $\theta_B$, whereby the reference spark timing $\theta = (\theta_{map} + \theta_B)$ is shifted in a direction toward the optimum point $\theta_M$ by a predetermined amount. The program now returns to step 400 to repeat the above process until the reference timing $\theta$ reaches the MBT point $\theta_M$.

Figure 4:
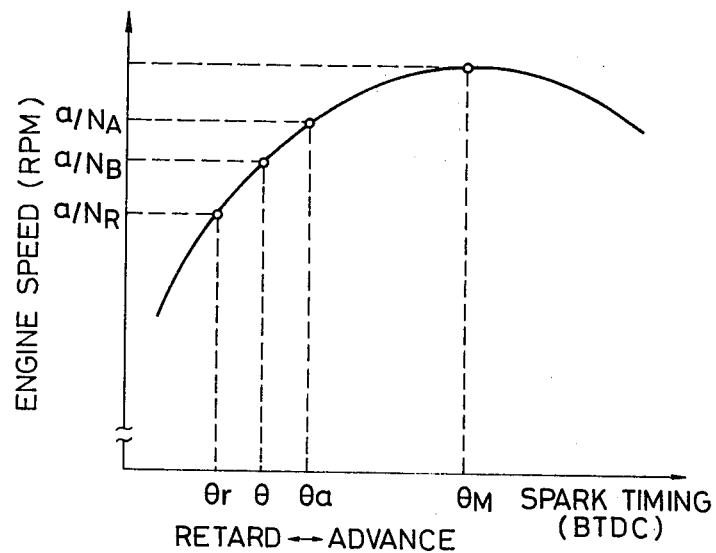
FIG. 4 is a graphic illustration of the operating characteristic of the invention which occurs in the absence of transient manual command input to the engine.

Conversely, if the reference timing $\theta$ is on the advance side of the MBT point, the relationship between the count values is reversed as seen from FIG. 4 and as a result the following relationship holds:

$$N_R < N_B < N_A$$

hence, $$a/N_R > a/N_B > a/N_A$$

This relationship is detected in step 431 to decrease the spark angle by $\Delta T_2$ by subtracting it from the correction angle $\theta_B$. The program now goes to step 400 again to repeat the above process until the reference angle $\theta$ reaches the MBT.

If neither of the above relations is detected in steps 430 and 431, the computer proceeds to step 434 to make no advance correction and returns to step 400. This condition corresponds to a situation in which the engine is accelerated on manual command during a sequence of events from steps 400 to 426, since the engine speed progressively increases and so a relation $a/N_B < a/N_A < a/N_R$ and hence $N_R < N_A < N_B$ is established which does not satisfy the condition specified in step 430 or 431. A similar situation occurs when the engine is decelerated since relation $a/N_B > a/N_A > a/N_R$ and hence $N_R > N_A > N_B$ results.

When the spark advance is at or near the MBT and no engine input command exists, the engine speed value $a/N_A$ is on the retard side of the MBT while $a/N_R$ is on the retard side of the MBT, so that the reference or basic engine speed value $a/N_B$ is greater than $a/N_A$ or $a/N_R$ and hence $N_B < N_A$ and $N_B < N_R$ result as clearly seen from FIG. 4, which apparently does not meet the condition specified in steps 430 or 431. The spark advance is thus maintained at or near the optimum point to produce maximum engine torque.

The magnitude of oscillation $\Delta t_1, \Delta t_2$, the amount of $\Delta T_1$ $\Delta T_2$, and the k value are chosen in relation to the engine operating performance having regard to its stability and to the repetition frequency of the clock pulse which is used to measure the engine speed during each ignition phase.

In the foregoing description the angle correction value $\theta_B$ was given a single data which is placed in storage in each ignition phase regardless of the changing engine conditions. It is preferable that the correction angle $\theta_B$ is stored in a mapped memory in each ignition phase in relation to a set of engine operating variables in order to change the $\theta_B$ value as a function of the detected engine conditions. This will render the system more responsive to a change in engine operating conditions to permit rapid correction of spark advance toward the optimum point.

Furthermore, it is also possible that the reference advance angle $\theta$ may be represented exclusively by the correction angle $\theta_B$ by relating it to the changing engine variables in a manner as described above.

Further modifications of the invention are obvious to those skilled in the art. For example, the order of different ignition phases and the number of such occurrences can be changed so that they occur in the order $\theta$, $\theta_a$, $\theta$, $\theta_r$ and $\theta$, in so far as the advance angle is oscillated with respect to the reference point between two spaced-apart points and in this case the engine speed is detected in at least three of the successive ignition phases including $\theta$, $\theta_a$ and $\theta_r$.

Figure 5:
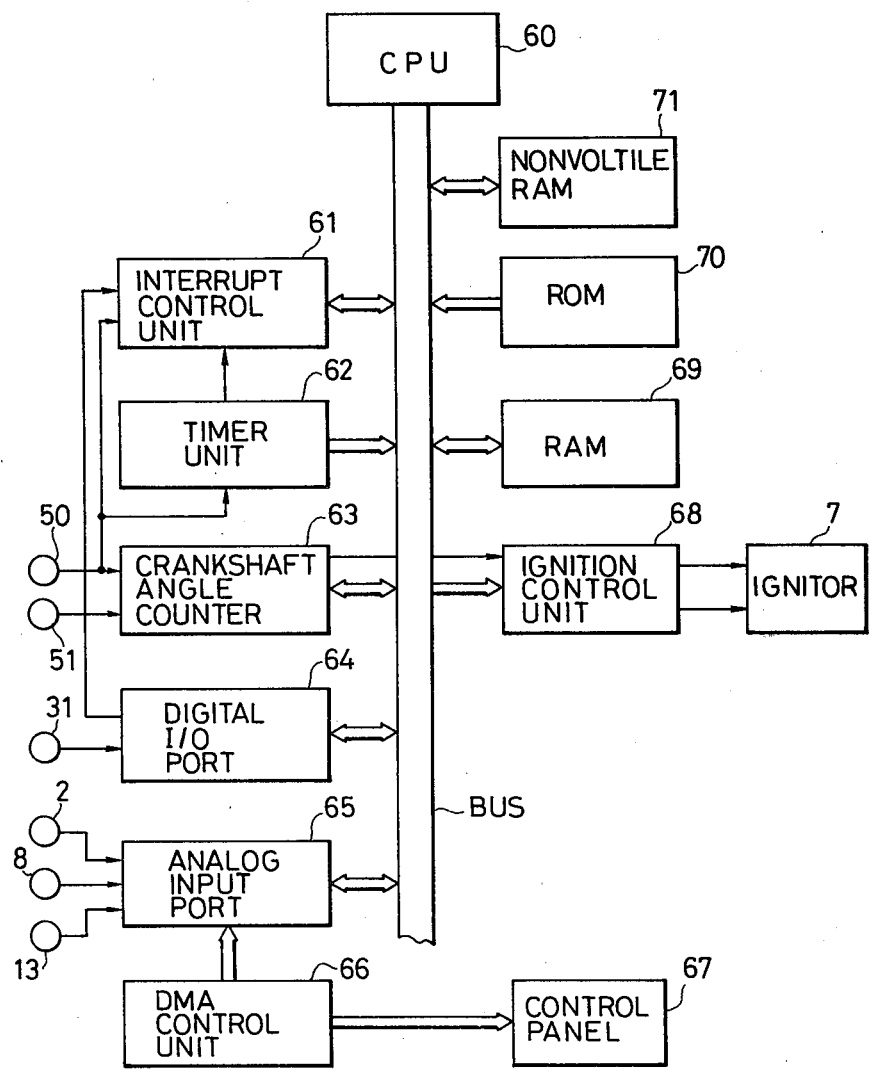
FIG. 5 is an illustration of the hardware of the computer of FIG. 1.

FIG. 5 is an illustration of the structure of the computer 6. Numeral 60 is the central processing unit of the 16-bit TMS9900 of Texas Instruments Inc., 70 is a read-only memory exclusively used for storing control programs and control variables, and 69 is a random access memory used for temporary storage of control data when the CPU is executing instructions according to the control program. A nonvolatile random access memory 71 stores a set of reference ignition instant data in a two dimensional map and is provided with an auxiliary power source to prevent erasure of the stored contents when the ignition switch is turned off.

Numeral 61 is an interrupt control unit which stops a running program by instructing the CPU 60 with three-level priorities. The interrupt routine involves an interrupt control in response to a signal from the crankshaft revolution sensor 5, a program interrupt in which I/O activity of a digital input/output port 64 is started by the CPU placing a "0" level on the program interrupt output port, and a timer interrupt which occurs at intervals of 8 milliseconds.

A timer unit 62 comprises a 16-bit counter which counts 8-microsecond clock pulses and a latch which is loaded with the output of the counter in response to the signal from the crankshaft revolution sensor 5. A crankshaft angle counter 63 is in receipt of a reference or top dead center pulse 5a from the sensing part 50 of the sensor 5 and angular position pulses 5b from the sensing part 51 of the sensor 5 to detect the angular position of the crankshaft with respect to the top dead center. When the CPU 60 is executing an interrupt control routine in response to the crankshaft angular position signal, the angular position data is read from the crankshaft angle counter 63 and the latched data from the timer unit 62 and these reading operations are performed with respect to two angular positions to detect the difference between the successively latched data to measure the time the crankshaft rotates between the two angular positions, whereby engine speed (R.P.M.) is measured. The crankshaft angle counter 63 is responsive to the signal from the crankshaft revolution sensor 5 and reset to zero in response to the angular position pulse which occurs subsequent to the reference pulse, so that the crankshaft angle position data is applied to the CPU 60 at every 30-degree crankshaft revolution.

The digital input/output port 64 receives a signal from the starter switch 31 indicating that the engine starter 3 is in operation and provides a program interrupt signal to the interrupt control unit 61. The signals from the engine coolant temperature sensor 2, pressure sensor 8 and battery 13 are applied to an analog input/output port 65 where the input signals are converted into digital form and transferred to the RAM 69 through a direct memory access (DMA) control unit 66. Therefore, the data stored in the RAM 69 is readily available and accessed by the CPU. The use of DMA control unit 66 permits data to be written in RAM 69 and data to be read from ROM 70, RAMs 69 and 71 in conjunction with a control panel 67, the latter also providing RUN and HOLD control over the CPU. The CPU 60 is electrically connected to each device through a bus including a data and an address bus.

Figure 6:
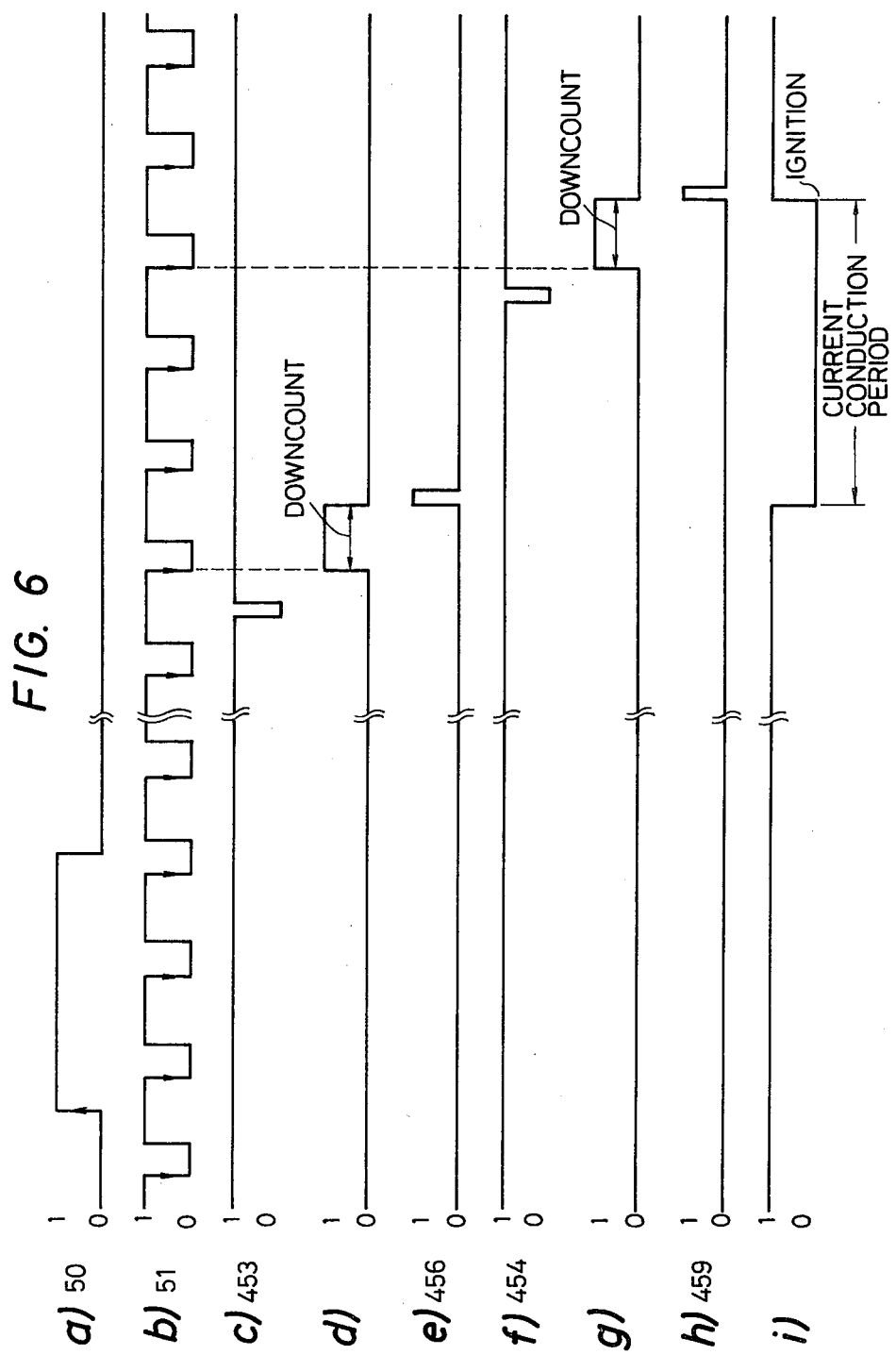
FIG. 6 is an illustration of a timing diagram associated with the hardware of FIG. 5.
Figure 7:
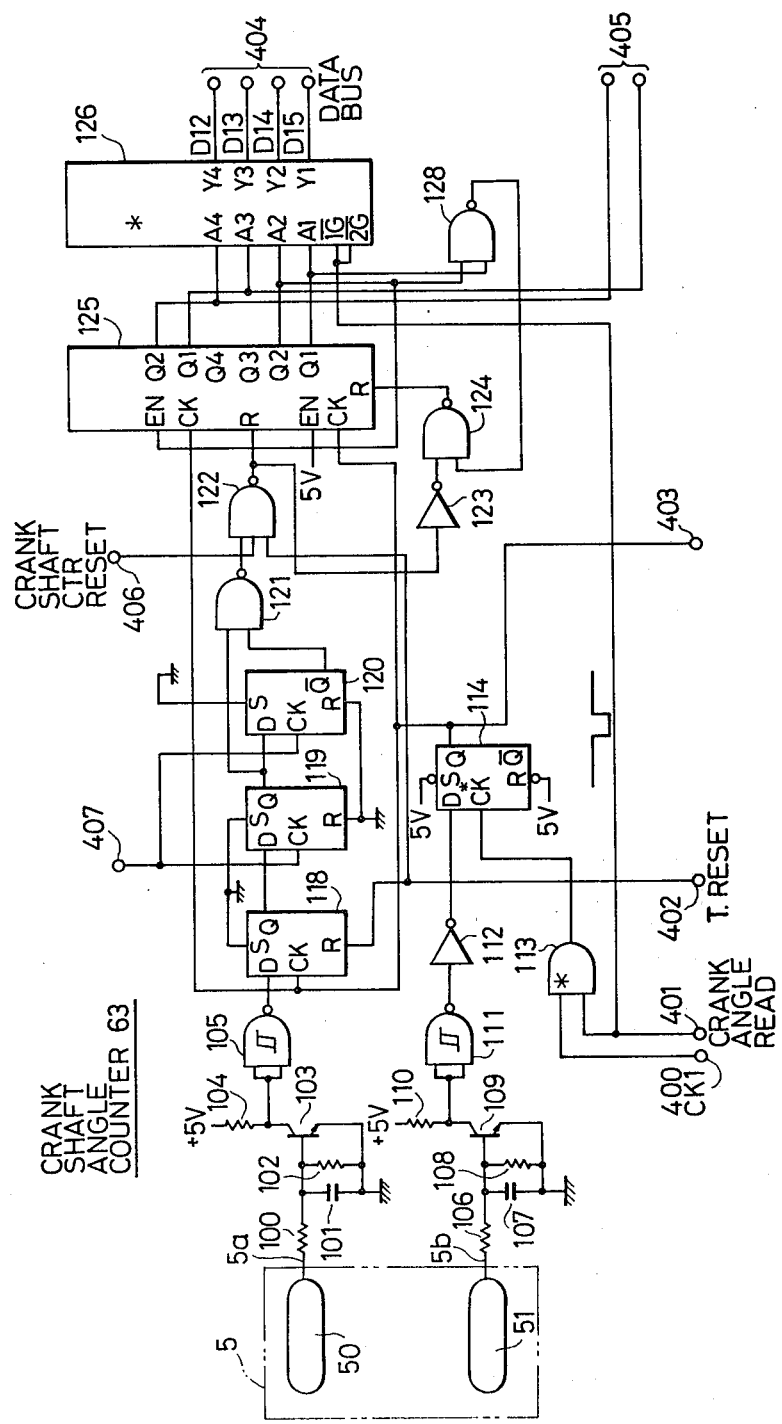
FIG. 7 is an illustration of the detail of the crankshaft angle counter unit of FIG. 5.

FIG. 7 is an illustration of the detail of the crankshaft angle counter unit 63, the output terminal of which represents the instantaneous angular position of the crankshaft responsive to the signals from the revolution sensor 5. The sensor 5 may be mounted on a rotary shaft which completes a 360° revolution for two revolutions of the crankshaft. The angle position pulse 5b (See FIG. 6b) from the position sensor 51 is fed into a lowpass filter formed by a resistor 106 and a capacitor 107 and thence to the base of a transistor 109 the collector of which is coupled to the input of a Schmitt trigger circuit 111 to define the binary level of the input signal and then applied through an inverter 112 to the data input of a Data-type flip-flop (hereinafter called D-type flip-flop, which is available as SN 74LS74, Texas Instruments Inc.) 114. This flip-flop is used to disable a counter 125 during the time when the CPU 60 is sending data in response to a crankshaft angle READ instruction by inhibiting clock pulses at terminal 400 in response to a logic zero on terminal 401 supplied to an AND gate 113. The Q output of the D-type flip-flop 114 is connected to the clock input CK of the 4-stage synchronous counter 125 (RCA CD 4520B) having its lower significant two stages coupled through NAND gates 128 and 124 to its higher significant two stages so that it generates an output pulse in response to every 12th input pulse. The contents of the counter 125 are incremented in response to the trailing edge of each crankshaft angle position pulse 5b and delivered to data bus 404 via a buffer 126 of the type SN 74LS244 of Texas Instruments Inc. in response to a READ instruction from the CPU 60. A top-dead-center pulse 5a from the sensor 50 (see FIG. 6a) indicates that the cylinders No. 1 and No. 4 reach their top dead center points and is applied to a lowpass filter formed by a resistor 100 and a capacitor 101 and thence to the base of a transistor 103 whose collector is connected to a Schmitt trigger circuit 105 to define the binary level of the input top-dead-center pulse. The TDC pulse is then applied to the data input of a D-type flip-flop 118 (RCA CD 4013B) whose clock input CK is in receipt of the crankshaft angular position signal derived from the Q output of flip-flop 114 and whose Q output is in turn connected to the data input of a D-flip-flop 119. Therefore, the counter 125 is reset to "0000" in response to a pulse which is generated through flip-flops 119 and 120 and a NAND gate 121 in response to the trailing edge of a crankshaft angle pulse 5b which occurs subsequent to the generation of a TDC pulse 5a. The pulse duration of the reset pulse is determined by the frequency of clock pulses supplied to an input terminal 407. This resetting operation is also effected by a T.RESET signal (an initializing signal for the system) supplied to an input terminal 402 and by a RESET command signal applied to an input terminal 406 from the CPU 60. The contents of the counter 125 "0000" thus correspond to the top dead center and "0100" to a 90-degree crankshaft angle. In FIGS. 7 to 15 the circuit elements marked with an asterisk comprise TTL logic elements and other logic elements are formed by CMOS elements. This permits high speed operation of the CPU since an all CMOS structure would impose limitations on the transfer speed of the interface circuitry.

Figure 8:
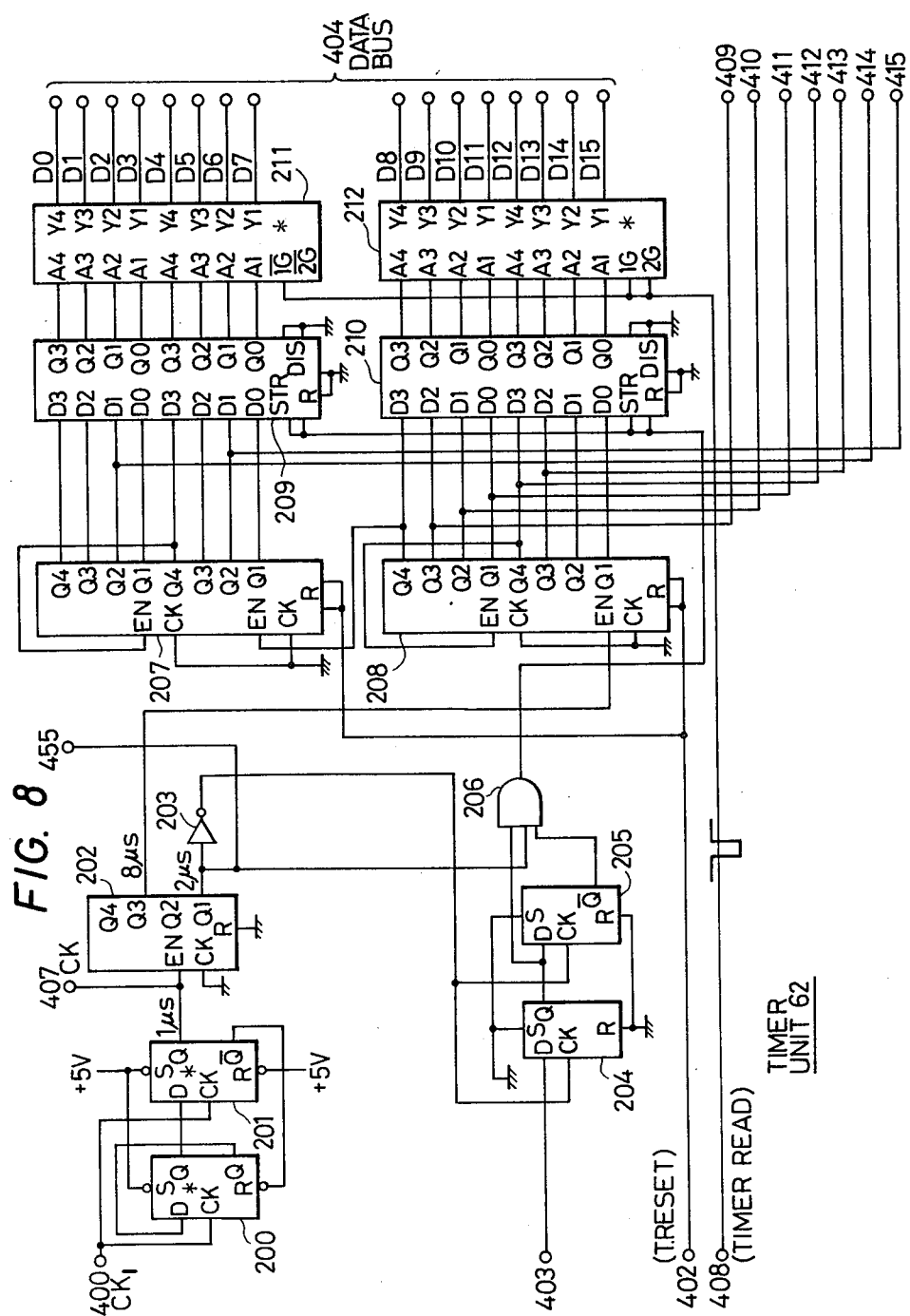
FIG. 8 is an illustration of the detail of the timer unit of FIG. 5.

Details of the timer unit 62 are illustrated in FIG. 8. Clock pulses $CK_1$ at a frequency of 3 MHz supplied to terminal 400 from the CPU 60 are frequency divided into ½ of its input frequency by means of cascaded D-flip-flops 200 and 201. The frequency divided clock pulses are supplied to a 4-bit counter 202 where the input frequency is further divided by a factor of 8 and coupled to an 8-bit counter 208 as a clock signal. The 8-bit counter 208 forms with an 8-bit counter 207 a 16-bit real time counter for purposes of counting the passage of time from zero to 524,280 microseconds. Eight-bit latches 209 and 210 (RCA CD4508B) are loaded with the contents of the counters 207 and 208 in response to the leading edge of each crankshaft angular pulse supplied from the counter 63 via terminal 403. The latched time data are transferred to buffers 211 and 212 in response to a timer READ instruction data through terminal 408 from the CPU 60 and thence to the CPU 60 through data buses 404. Flip-flops 204 and 205 are used to derive the latch strobe pulse of 2-microsecond duration in response to the leading edge transition of the crankshaft angular position pulse fed to the terminal 403. A three-input AND gate 206 is provided to introduce a maximum delay of 1 microsecond into the latching action when the least significant bit of the counter 202 is "zero" for purposes of preventing the occurrence of overlapped actions of count increment in the counters 207 and 208 and loading of the count into the latches 209 and 210.

Figure 9:
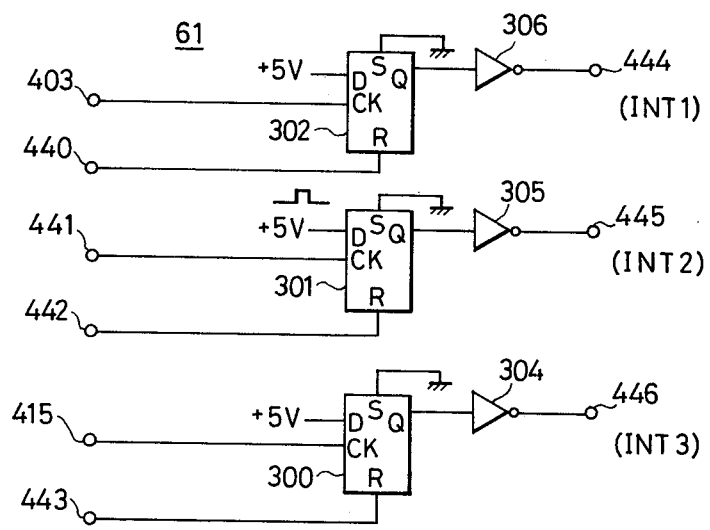
FIG. 9 is an illustration of the detail of the interrupt control unit of FIG. 5.

The structure and operation of the interrupt control unit 61 will now be explained with reference to FIG. 9. Crankshaft angle pulses are supplied through terminal 403 to the clock input of a D-type flip-flop 302 serving as a gear interrupt flag to cause it to be set into "one" state in response to each 30-degree crankshaft revolution, the "one" state of the interrupt flag being transmitted through an inverter buffer 306 and terminal 444 to the CPU 60 as an interrupt request signal. Upon receipt of this interrupt request signal, the CPU 60 resets the interrupt flag to "zero" by applying a pulse to terminal 440 after it initiates an interrupt program which will be described later. If, during the time the gear interrupt program is being executed, a program interrupt port is set to a "one" state, a program interrupt flag or D-type flip-flop 301 is also set into "one" resulting in an interrupt request which is transmitted to the CPU 60. The flag 301 will be reset by a pulse from the CPU via terminal 442. An 8.192-millisecond clock pulse is supplied from the 16-bit counter 207,208 through a terminal 415 to an 8-millisecond interrupt flag or D-type flip-flop 300 which is set in response thereto to generate an interrupt request on the CPU 60. More specifically, the 8-millisecond interrupt is requested at intervals of 8,192 milliseconds and used as a time base for the software of the computer 6. This interrupt is also reset by an instruction given at terminal 443 from the CPU.

Figure 10:
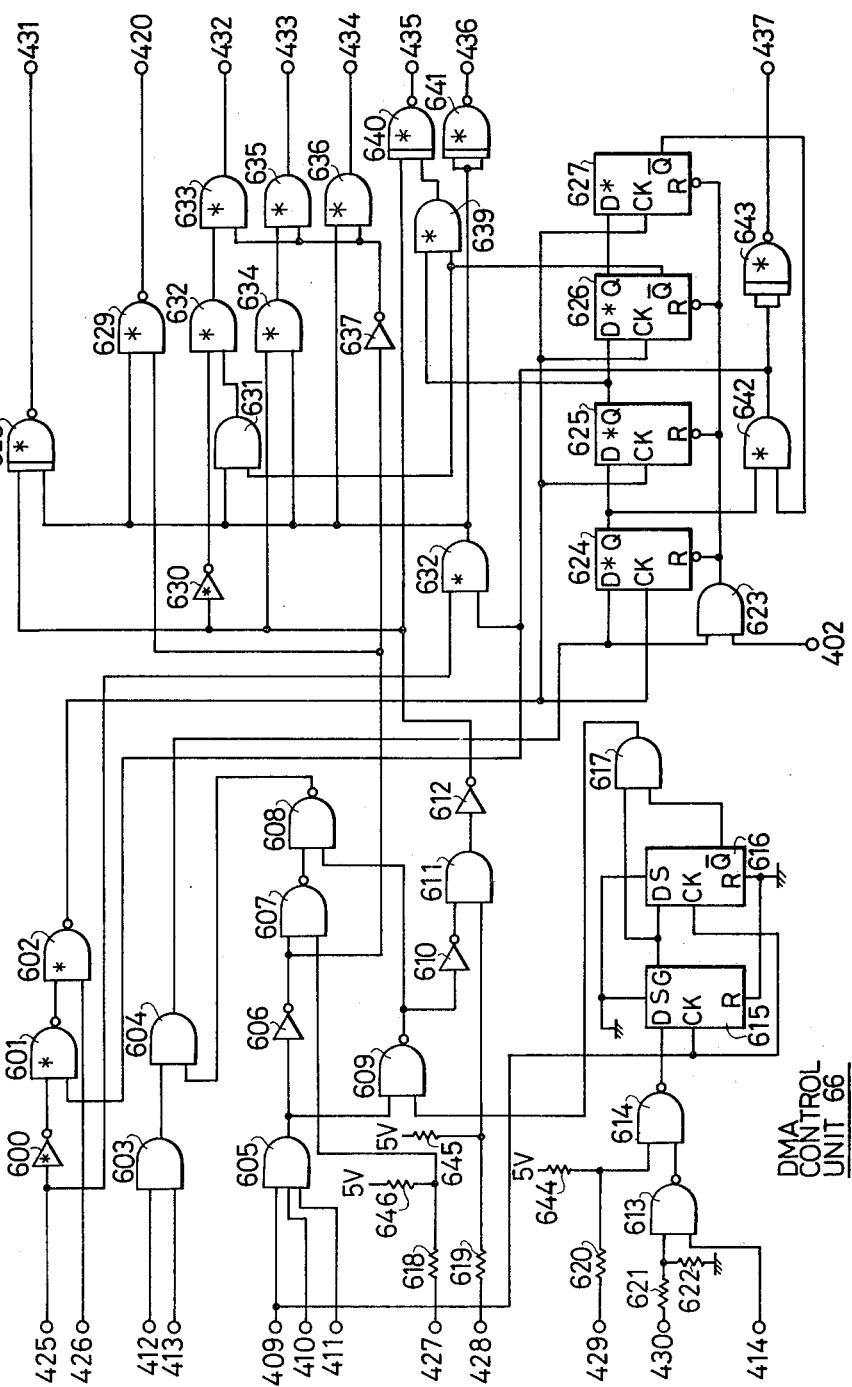
FIG. 10 is an illustration of the detail of the DMA control unit of FIG. 5.
Figure 11:
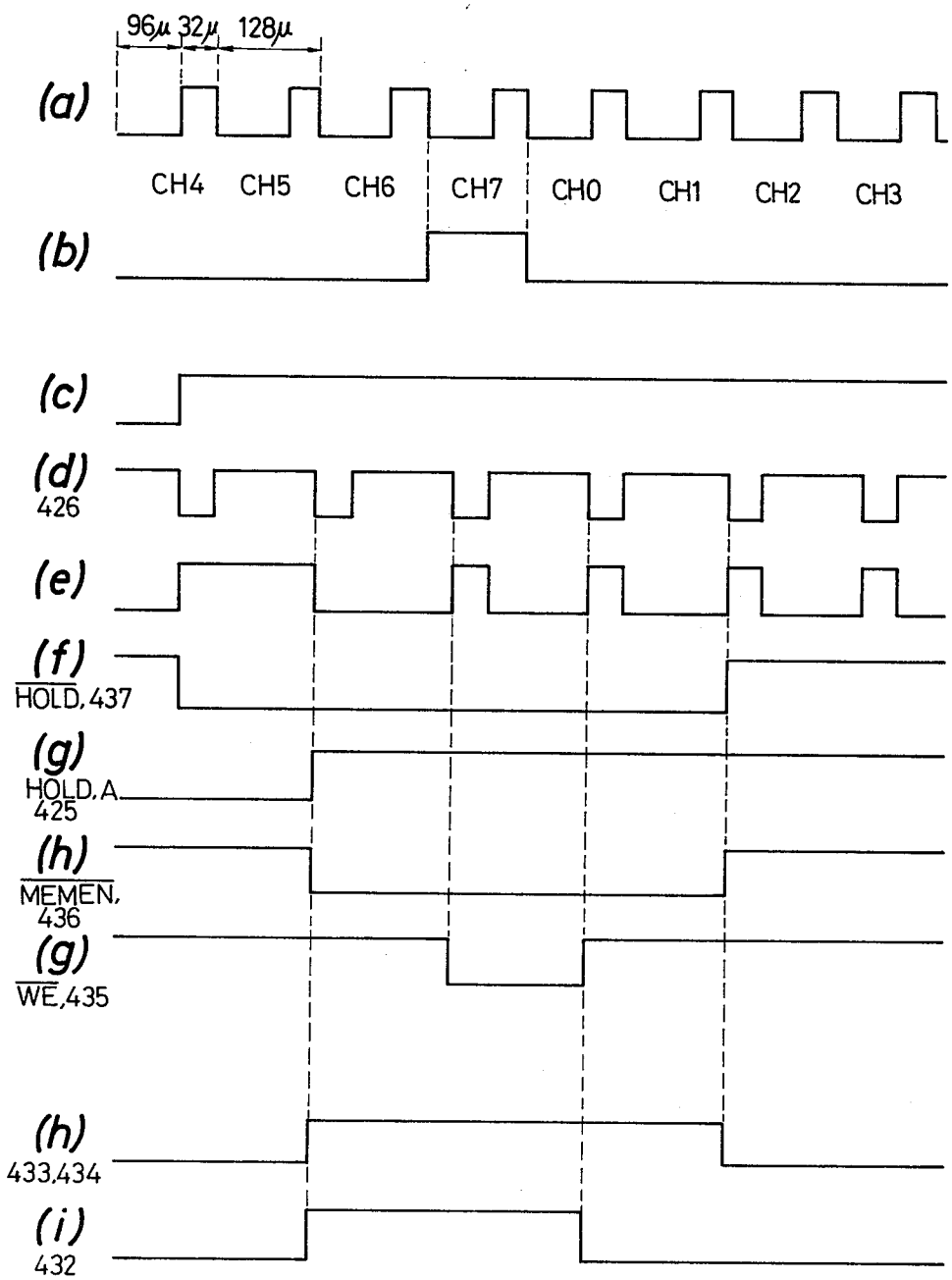
FIG. 11 is an illustration of a timing diagram associated with the circuit of FIG. 10.
Figure 13:
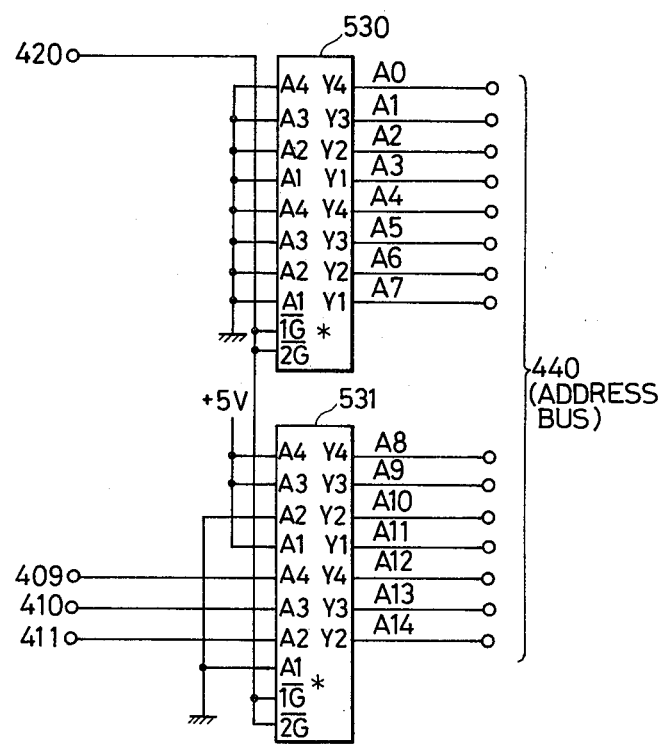
FIG. 13 is an illustration of the detail of an analog digital conversion address register associated with the DMA control unit.

The DMA control unit 66 will now be described with reference to FIGS. 10, 11 and 13. The output signals from the counters 207 and 208 of the timer unit 62 (FIG. 8) are supplied to input terminals 409 to 413 for generating a HOLD request signal at an output terminal 437 to make a request that the CPU 60 temporarily suspend the execution of a running program. An AND gate 603 places a "1" on its output in response to a "1" on the output terminals 413 and 412 connected respectively to the bit 2 and bit 3 outputs of the real time counters 207, 208. The output of the AND gate 603 is illustrated in FIG. 11a. Likewise, a three-input AND gate 605 whose inputs are connected to the terminals 409 to 411 changes its output state as shown in FIG. 11b. Resistances 618 to 622, 644 to 646 are provided for protecting CMOS elements. The DMA control unit is provided with 8 channels through which data is transferred at intervals of 1 millisecond to the RAM 69. Among the eight channels, seven channels (channels Nos. 0 to 6 in FIG. 11a) are used for transmitting digitally converted signals while the channel No. 7 is used for transmitting data associated with the control panel 67. The analog-digital conversion is accomplished during an interval of 96 microseconds (FIG. 11a) and the digitally converted signal is transmitted during the subsequent period of 32 microseconds. When the AND gate 603 is switched to "1" in the absence of an external HOLD request signal to the computer from the control panel 67 (terminal 427 is "1"), AND gate 605 is switched to "0", AND gate 608 is switched to "1", so that a register 624 (TI 74LS175) is given a "1" bit on its D input terminal. Since the Q output of the register 624 is still at "0" immediately following the application of a "1" bit to the D input thereof, the output of an AND gate 642 remains at "0" causing a NAND gate 601 to change to "1" to permit application of clock pulses at a frequency of 3 MHz from the CPU 60 through terminal 426 to the clock input CK of the register 624, whereby the register 624 provides an output "1" in response to a clock pulse which appears immediately following the "1" bit pulse on the D input (FIGS. 11c and 11d). An AND gate 642 is then switched to "1" and hence a "0" output appears from a tri-state NAND gate 643 (TI 74LS38) generating a HOLD request signal (logic "0") for initiating a direct memory access control (FIG. 11f). The CPU 60 then applies an accept signal HOLD-A to a terminal 425 (FIG. 11g) at the end of a machine cycle which is being executed. During the interval between the negative transition at terminal 437 (FIG. 11f) and the positive transition at terminal 425 (FIG. 11g), the output of the NAND gate 601 is held at "0", so that the 3 MHz clock pulse at the terminal 426 is inhibited. A register 625 is clocked in response to the "1" logic HOLD-A signal to change its output state to "1". Register 626 changes its Q output state to "1" in response to a subsequent clock pulse which is followed by a change in the Q̄ output of register 627 to "0" in response to the next clock pulse. This results in a high impedance state in the output of the NAND gate 643 cancelling the HOLD request to complete a DMA cycle. When the HOLD-A signal is switched to "1", an AND gate 638 is switched to "1" resulting in a "0" logic at the output of a tri-state NAND gate 641 which is coupled to an output terminal 436. The logic state of the terminal 436 is "0" during the interval between the positive transition of the HOLD-A signal and the positive transition of the HOLD signal and applied to the RAM 69 as a memory enable signal (MEMEN), as shown in FIG. 11h. A tri-state NAND gate 640 is switched to "0" output state (FIG. 11i) when AND gate 639 has a "1" output due to the "1" logic states of the Q and $\overline{Q}$ outputs of registers 625 and 626, while, on the other hand, the NAND gate 605 is delivering a "0" output during the time the channels Nos. 0 to 6 are selected, resulting in a "1" at the output of an inverter 612. A "0" bit signal is thus applied to the RAM 69 through a terminal 435 as a WRITE instruction ($\overline{WE}$). The READ signal to the RAM 69 is not yet generated when the memory enable signal is "0". When the the HOLD-A signal is "1" within the interval of the DMA cycle, the CPU 60 suspends its operation and the data bus for the memory enable, read and write operations are switched to a high impedance state. Therefore, data transfer is accomplished directly from the DMA control unit 66 to the RAM 69 during this CPU suspension interval.

Data transmission through channel Nos. 0 to 6 is effected when inverter 606 places a "1" to a NAND gate 629 to generate a waveform similar to that shown in FIG. 11h which is applied through terminal 420 to analog-digital conversion data registers 518 and 519 (see FIG. 12) and to analog-digital conversion address registers 530 and 531 to serve as their strobe signals. In other words, when the memory enable signal is "0", the digitally converted signals are delivered to data bus 404 and address signals associated with the channels Nos. 0 to 6 are delivered to the address buses 440 (FIG. 13). All of these output data are written into the RAM 69 in response to the write signal. In cases where a externally applied HOLD request is made from the control panel 67, the NAND gate 607 is switched to "0" output state by a logic "1" placed on terminal 427 from the control panel 67 and inhibits the output of the AND gate 603 thus preventing the application of a "1" bit to the data input of the register 624, so that the DMA cycle is not initiated. Data transfer through the channel No. 7 between the control panel 67 and the RAM 69 is accomplished in a DMA cycle in which the control unit receives a read-write (R/$\overline{W}$) signal at terminal 428, a data transfer request signal at terminal 429, a consecutive READ signal at terminal 430, and 128-millisecond clock pulses from the timer unit 62 at terminal 414. When the request is made at the control panel 67 for transferring data from the panel 67 to the RAM 69, the logic states of the terminals 428, 429 and 430 are brought to "0", causing AND gates 605 and 603 to change to "1" (FIGS. 11a and 11b) to initiate the DMA cycle with respect to the channel No. 7. By the action of registers 615 and 616, a positive going pulse with a duration of 1.0 milliseconds appears at the output of the AND gate 617 immediately following the negative transition of the logic state at the terminal 429 from "1" to "0". This pulse is converted into a negative going pulse with a duration of 128 microseconds by means of a NAND gate 609 and passed through NAND gate 608 and AND gate 604 where the pulse is converted into a positive polarity with a duration of 32 microseconds and applied to the data input of the register 624. When a write request is made at the control panel 67, the data bus for the $\overline{HOLD}$, HOLD-A, memory enable ($\overline{ME-MEN}$), write ($\overline{WE}$) and read (DBIN) signals are controlled in the same manner as in the previously described DMA cycle for A/D conversion data (FIGS. 11f to 11i). A positive pulse appears at terminals 434 and 432 during the time the memory enable is "0" (FIGS.

11j and 11k) in order that the address data stored in the associated registers are transferred to the RAM 69, the positive pulses being supplied to the control panel 67. The logic states of terminals 429 and 430 are "0" and the logic state of terminal 428 is "1" when data write request is made from the control panel 67 to the RAM 69 and ROM 70. In this DMA cycle, the control line at 436 is "0", the control line at 435 is "1" and the control line at 431 is "1" because of the presence of a "1" at the output of AND gate 611. Control for the other lines is similar to that associated with the transfer of digitally converted data from the control panel 67 during the read cycle. When the continuous read signal at terminal 430 is "1", clock pulses of 128 milliseconds are generated at the output of NAND gate 613, which permits data transfer from the RAM 69 and ROM 70 to the control panel 67 at intervals of 128 milliseconds. The DMA cycle which is initiated upon a request from the control panel 67 is performed regardless of the presence of an external HOLD request signal at terminal 427.

Figure 12:
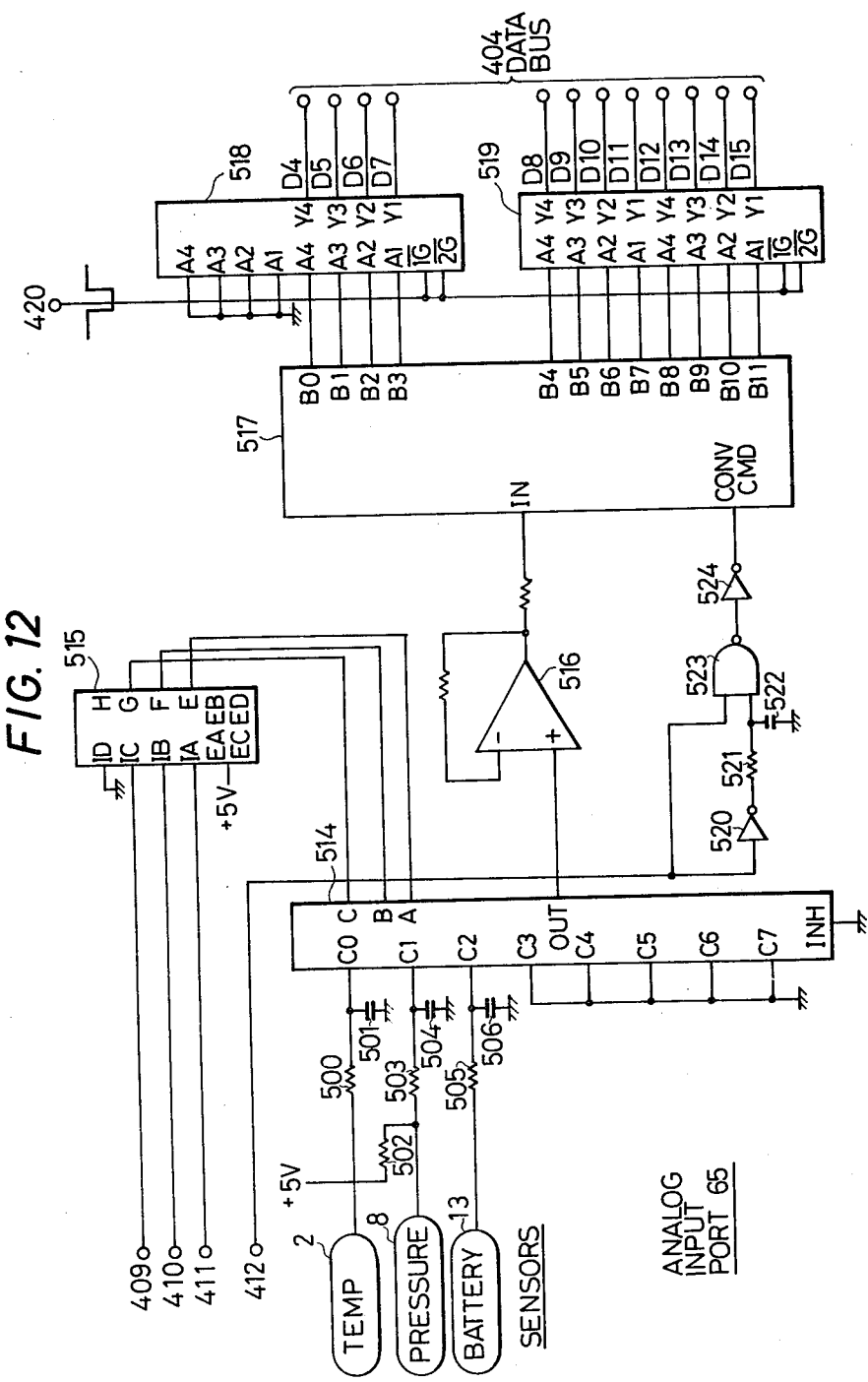
FIG. 12 is an illustration of the detail of the analog input port of FIG. 5.

The following is a description concerned with the analog input port 65 in connection with FIG. 12. RC networks formed by elements 500 to 506 are connected to the sensors 2, 8 and 13 for the purpose of eliminating noise introduced into the signal transmission lines. The filtered input signals from the sensors 2, 8 and 13 are coupled to a multiplexer (RCA CD4051B) through its input terminals C0 to C2 where the input signals are selectively coupled to an output terminal (OUT) in response to the binary levels of control signals applied to terminals A, B and C. More specifically, when the A, B and C input levels are all "0"s, the signal at the terminal C0 is selected for delivery to the output and when they are respectively "1", "0" and "0", the signal at the terminal C1 is selected. The address signals are derived from a level converter 515 (RCA CD40109B) whose inputs are coupled to the real time counters 207 and 208 of the timer unit 62, so that the signals at the terminals C0, C1 and C2 are successively selected in this order at intervals of 128 microseconds. An input terminal 412 is also connected to the counter 208 to receive clock pulses of 64 microseconds with which the address control for the multiplexer 514 is synchronized. An analog-to-digital conversion start pulse is generated by a circuit including inverters 520 and 524, NAND gate 523, register 521 and capacitor 522, in response to the clock pulse applied to the terminal 412, and applied to the CONV CMD input of an analog-digital converter 517 (ACD-80AG of Bur Brown) to initiate analog-digital conversion on input signals supplied from the multiplexer 514 through an operational amplifier 516 to input terminal IN. Within an interval of about 40 microseconds, the analog-digital converter 517 delivers digitally converted signals after receipt of the start signal, the converted signals being in the form of 12 bits which are supplied to the output terminals B0 to B11 and thence to buffers 518 and 519 when a DMA data transfer cycle is initiated 96 microseconds after the application of the start signal to thereby transfer the 12-bit data to the storage cells of RAM 69 associated with the selected channel.

Figure 14:
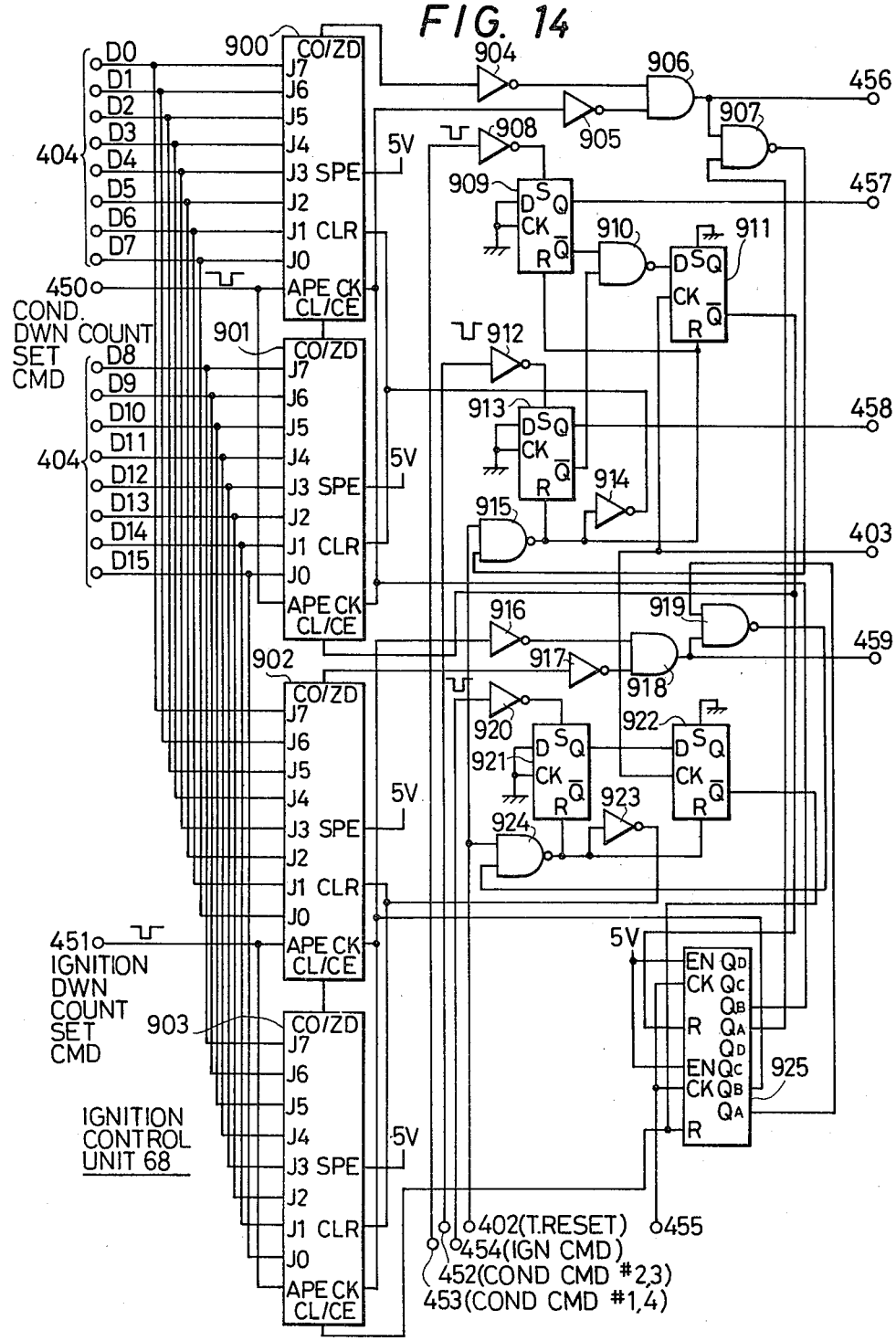
FIGS. 14 and 15 are an illustration of the detail of the spark ignition control unit of FIG. 5.
Figure 15:
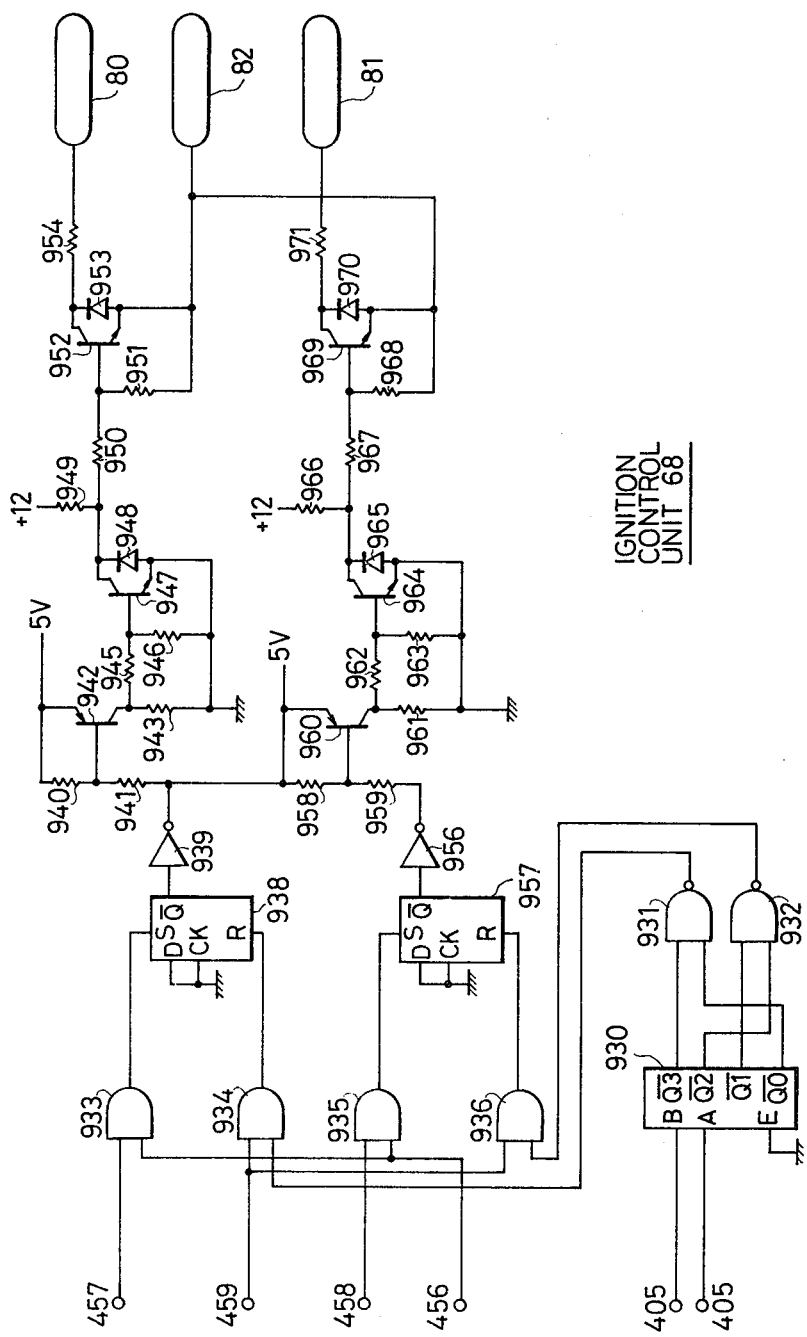

Next, the description is concerned with an ignition control unit 68 with reference to FIGS. 6, 14 and 15. For the purpose of the disclosure, the process of generating sparks in the Nos. 1 and 4 cylinders will be described. As described previously, the CPU 60 is constantly informed of the instantaneous crankshaft angular position with respect to the top dead center by the crankshaft angle counter unit 63 at each revolution of 30 degrees (=360°/12). The CPU 60 performs the computational operation according to the stored program to derive optimum values for the period of conducting spark current and for the spark instant. The current conduction period which is represented by angle θ is given as follows:

$$\theta = \theta_1 + \theta_2 \quad (1)$$

$$t = t(\theta_2, N) \quad (2)$$

where, $\theta_1$: the crank angle at which conduction of spark current occurs at intervals of 30 degrees corresponding to each gear position of the sensor 5;

$\theta_2$: the residue smaller than 30 degrees; and t: the time period which is an integral multiple of an 8-microsecond unit time as a function of crankshaft revolutions N to represent the residue $\theta_2$.

The derived gear or crankshaft position $\theta_1$ according to the above Equation is utilized by the CPU 60 during the previously described gear interrupt which is generated when the gear position is ($\theta_1 - 1$). The CPU generates coil energization instructions with respect to the cylinders Nos. 1 and 4 on terminal 453 (FIG. 6c) and a downcount set instruction on terminal 450. In response to the pulse applied to the terminal 450, the time period data "t" are transferred from the CPU over data buses 404 to 8-bit downcounters 900 and 901 (RCA CD 40103B) which are connected in series to form a 16-bit downcounter to downcount at 8-microsecond intervals in a range from zero to 0.52428 seconds. This allows binary representation of engine speed as low as 3 r.p.m.

A flip-flop 909 is triggered into a set condition in response to a pulse on the terminal 453, resulting in a "0" at the $\overline{Q}$ output which in turn results in a "1" at the output of NAND gate 910 and hence to the D input of a D-type flip-flop 911. The clock input CK of the flip-flop 911 is connected to a terminal 403 and thence to the crankshaft angle counter 63 (FIG. 7), so that its Q output changes to the binary state of the data input (that is "1") in response to a crankshaft angular pulse which occurs subsequent to the downcount set instruction, as illustrated in FIG. 6d. This places a "0" on the Q output of the flip-flop 911 which in turn removes the reset signal from a 4-bit frequency divider 925 to cause it to provide clock pulses to the clock inputs CK of the downcounters 900 and 901 which are enabled by the "0" output of the flip-flop 911 coupled to their CL/CE inputs. The frequency divider 425, which may be of CD4520B available from RCA, receives 2-microsecond clock pulses through an input terminal 455 from a 4-bit downcounter 202 of the timer unit 62 and divides its frequency so that its output frequency is ¼th the input frequency. This provides a precision timing control particularly when t=0, 1. After completion of a 16-bit downcounting operation, an end-of-downcount signal is delivered to the CO/ZD terminal of the counter 900 in the form of a logic "0" which is coupled through an inverter 904 to an input of an AND gate 906 and via NAND gates 907 and 915 to the reset terminals of flip-flops 909 and 911 (see also FIG. 6d). The same reset signal is also applied via inverter 914 to the clear terminals CLR of the downcounters 900 and 901 causing the logic state of the terminal CO/ZD to return to "1", thus generating a pulse as shown in FIG. 6e at the output of the AND gate 906 and hence at the terminal 456. Concurrently, the downcounters 900 and 901 are disabled in response to a logic "0" from the $\overline{Q}$ output of the flip-flop 911 when the latter is reset. In order to prevent the generation of a false pulse (possibly with a duration of 200 nanoseconds) which negatively biases the CO/ZD output the downcounter 900 immediately following the application of a downcount clock thereto, an inverter 905 is inserted in an input circuit to the AND gate 906 so that the output of the latter changes to "1" four microseconds later than the occurrence of the end-of-downcount signal. The output of the AND gate 906 is connected through a terminal 456 to AND gates 933 and 935 (FIG. 15).

Since the flip-flop 909 is now under set condition, the AND gate 933 is activated in response to the output signal from the AND gate 906 via terminal 456 to set a flip-flop 938 (FIG. 15) which will eventually activate the ignition coils Nos. 1 and 4. More specifically, a "1" output from the $\overline{Q}$ terminal of the flip-flop 938 is inverted at 939, which turns off transistors 942 and 947 and turns on transistor 952 and produces a current flow between an ignitor 80 and a ground terminal 82 to initiate conduction of spark current in the ignition coils associated with the cylinders Nos. 1 and 4. Diodes 948 and 953 are provided for the purpose of protecting the transistors 947 and 952, respectively, and resistors 940, 941, 943, 945, 946, 949–951, and 954 are for the purpose of attenuating spark noise.

The flip-flops 909 and 911 are reset when the AND gate 907 receives a 2-microsecond clock pulse from the frequency divider 925, whereby the set pulse applied to the flip-flop 938 prevails for an interval of 2 microseconds which is sufficient to cause the latter flip-flop to be triggered into set condition. The advance angle or ignition instant $\theta_{BX}$ is given by the following Equations:

$$\theta_{BX} = \theta_{BX1} + \theta_{BX2} \quad (3)$$

$$t_x = t_x(\theta_{BX2}, N) \quad (4)$$

where, $\theta_{BX1}$: the crank angle at which spark ignition occurs at intervals of 30 degrees;

$\theta_{BX2}$: the residue smaller than 30 degrees;

$t_x$: the time period which is an integral multiple of of an 8-microsecond unit time as a function of crankshaft revolutions S to represent the residue $\theta_{BX2}$.

The gear or crankshaft position $\theta_{BX1}$ derived according to Equation 3 is again utilized by the CPU 60 during a gear interrupt generated in response to the leading edge transition of crankshaft angle position pulse 5b from the sensor 51 when the crankshaft gear position corresponds to $\theta_{BX1} - 1$. The CPU 60 generates an ignition command pulse (see FIG. 6f) which appears at terminal 454 (FIG. 14) to set a flip-flop 921 via inverter 920 and at the same time places a downcount set instruction on terminal 451 which is applied to a 16-bit downcounter formed by cascaded 8-bit downcounters 902 and 903 in order to load them with a data representing $t_x$. When the crankshaft reaches a position corresponding to $\theta_{BX1}$, a flip-flop 922 is set and the 16-bit downcounter 902,903 initiates downcount operation at 8-microsecond clock intervals. At the end of the downcount operation a positive going pulse (FIG. 6h) appears at a terminal 459. FIG. 6g illustrates the interval during which the downcount operation prevails.

In FIG. 15, a decoder (RCA CD4556B) has its A and B input terminals connected respectively to the higher two-bit outputs of the counter 125 of crankshaft angle counter unit 63 (FIG. 7) through terminals 405, so that a NAND gate 931, connected to the outputs of the decoder 930, generates a "1" output when the crankshaft angle is within a range from zero to 90 degrees or a range from 270 to 360 degrees, and a NAND gate 932, which is also connected to that decoder, provides a "1" output when the angle is within a range from 90 to 270 degrees. Since the ignition crankshaft angle for the cylinders Nos. 1 and 4 is usually within a range from 290 to 360 degrees while the ignition angle for the cylinders Nos. 2 and 3 is within a range from 110 to 180 degrees, the group of cylinders to be ignited can be appropriately identified without the need to receive information from the CPU as to which one of the cylinder groups is to be ignited. The "1" output from the NAND gate 931 is thus an indication that the cylinders Nos. 1 and 4 are the ones in which ignition must proceed and activates an AND gate 934 in response to the "1" output through terminal 459, thus resetting the flip-flop 938. The binary state of the flip-flop 938 is illustrated in FIG. 6i. Therefore, the transistors 942 and 947 are turned on, transistors 952 is turned off and the current flow through the ignitor 80 is cut off, resulting in generation of a high tension potential at the spark plug of the one of the cylinders Nos. 1 and 4 which is in the compression stroke.

A similar process to that described above will be performed when ignition occurs in the cylinders Nos. 2 and 3 with the exception that flip-flop 957 is set in response to an output from terminal 458 and AND gate 935 to generate a spark current through ignitor 81 to ground terminal 82 and NAND gate 932 is activated subsequently to reset the flip-flop 957 to cut off the spark current.

The following is a description concerned with the control algorithm of the computer 6. The interrupt routines are assigned with three different priority levels as shown in Table I and the main routine is executed in the absence of these interrupt routines.

TABLE I

| PRIORITY LEVEL | ROUTINES |
| --- | --- |
| Top priority | Crankshaft gear interrupt |
| Second priority | Program interrupt |
| Third priority | 8 ms interrupt |

Figure 16:
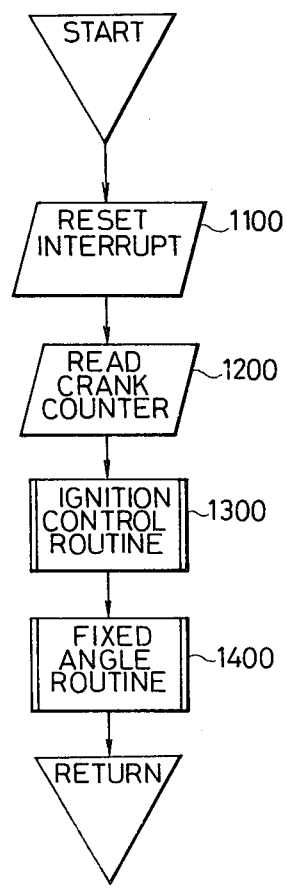
FIG. 16 is an illustration of a flowchart of gear or crankshaft angle interrupt routine.

In FIG. 16, the crankshaft gear interrupt routine, which is given the top priority, is started in response to a crankshaft angle pulse supplied from the interrupt control unit 61 through terminal 444 (FIG. 9), so that it occurs at each 30-degree revolution of the crankshaft with respect to the top dead center of the cylinder No. 1 or No. 4. The interrupt control starts at step 1100 to reset gear interrupt by resetting the flip-flop 302 of FIG. 9 and proceeds to step 1200 in which the CPU 60 reads off the instantaneous value of crankshaft revolution angle from the counter 125 (FIG. 7) of counter unit 63 by a read operation. Control is shifted to step 1300 in which the ignition control unit 68 is loaded with data derived from step 2140 which will be described later to provide ignition and then proceeds to step 1400 to execute operations associated with predetermined crankshaft positions.

Figure 17:
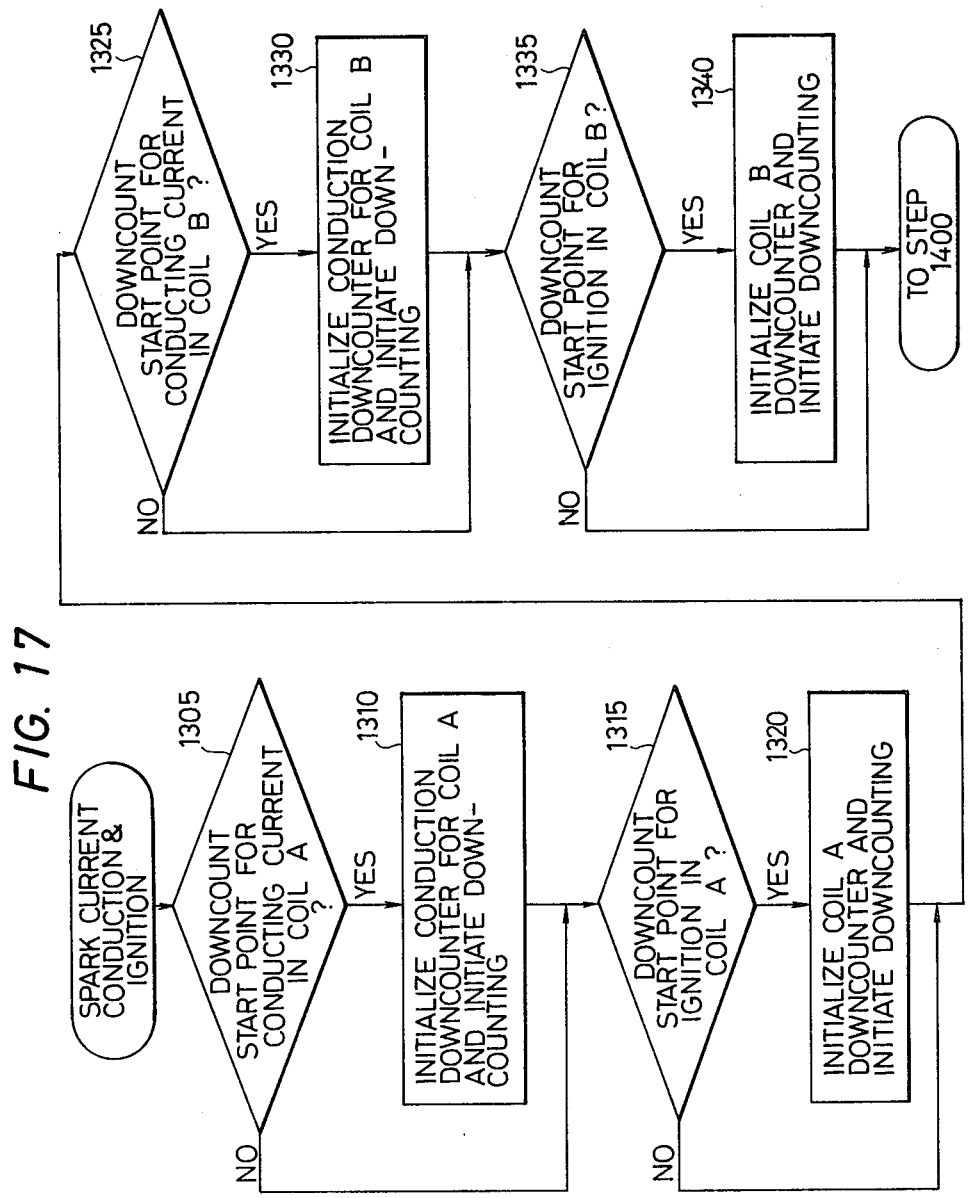
FIG. 17 is an illustration of a flowchart of spark ignition routine.

The flowchart of the ignition routine in step 1300 is illustrated in FIG. 17. In step 1305 the downcount value used for initiating spark current into coil A (one of the two ignition coils) as derived from the step 2140 during program interrupt operation, is compared with the crankshaft angle detected in step 1200 to detect a match between them, and if so, control proceeds to step 1310 to establish an initial setting in the downcounter 900 for coil A (FIG. 14) and deliver start instruction to generate a spark current in the coil A when the counter 900 has downcounted to zero at an 8-microsecond clock rate. In step 1315 a comparison is made between the angle at which the ignition downcount is started and the angle detected in step 1200 to detect a match between them, and if a match is detected, control goes to step 1320 to establish an initial setting in the ignition downcounter 902 and deliver an ignition command to cut off the spark current when the downcount 902 has downcounted to zero at an 8-microsecond clock rate. In respect of coil B, steps 1325, 1330, 1335 and 1340 are successively executed in a similar manner to that described above with respect to coil A.

Figure 18:
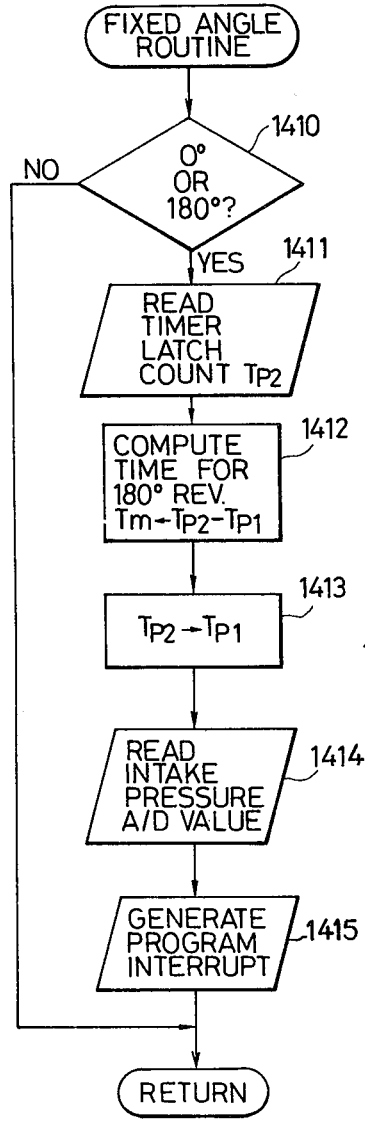
FIG. 18 is an illustration of a flowchart of fixed crankshaft point routine.

FIG. 18 is an illustration of the details of the step 1400 in which a specified set of operations is executed at fixed points of crankshaft revolution, which is in contrast with the step 1300 where the process is executed at different points of crankshaft revolution depending on the value computed during the program interrupt. More specifically, the process involves measuring the time the crankshaft takes in turn from the zero-degree point to a 180-degree point, measuring the intake vacuum pressure and generating a program interrupt command. In step 1410, the angular points zero and 180 are detected to proceed to step 1411 to read off the real time data from the counters 207 and 208 (FIG. 8) in response to the detected angular points, the real time data being placed in storage as $TP_2$. The data which has been read off in the previous fixed angle routine is now stored as $TP_1$. In step 1412 the amount of time between the detected angular points is computed by subtracting $TP_1$ from $TP_2$ as follows:

$$Tm = TP_2 - TP_1 \tag{5}$$

In step 1413, the real time, data $TP_2$ is substituted for the data $TP_1$ and stored as $TP_1$ for later derivation of Tm. In step 1414, digitally converted intake pressure value is read off for compensating for the intake pressure pulsation, and in step 1415 a program interrupt routine is initiated by momentarily placing a "0" at the program interrupt port of the I/O port 64.

The program interrupt routine will now be described with reference to FIG. 19. In step 2100 the flip-flop 301 (FIG. 9) is reset by applying a reset signal to terminal 442 to place a program interrupt request signal on terminal 445. In step 2111, crankshaft rpm or engine speed value S is computed by the following Equation using the time data Tm derived in step 1412 of the gear interrupt routine:

$$S(rpm) = 10^7 \times (3/Tm) \tag{6}$$

In step 2112 the intake pressure value Vpm derived in step 1414 (FIG. 18) is corrected to derive a value Pm as follows:

$$Pm = A_1 \times Vpm + A_2 \tag{7}$$

where, $A_1$, and $A_2$ are conversion coefficients. In step 2120 the operating state of the starter switch 31 (FIG. 1) is interrogated. If the switch 31 is operated, the control goes to step 2150 to place a fixed amount of 10 degrees in storage as a final advance angle data $\theta_M$ and then proceeds to step 2140 where the output data for the ignition control unit 68 is derived. If the switch 31 is not operated, the control proceeds to step 2130 to detect the final advance angle $\theta_M$ and then proceeds to step 2140.

Before going into the details of the step 2130 which will be described later with reference to FIGS. 20 to 23, reference is now had to FIG. 24 in which the stored contents of nonvolatile RAM 71 of FIG. 5 are illustrated in a two dimensional map. The map comprises columns $X_i$ where "i" ranges from 0 to 15 corresponding to discrete values of engine rpm S and rows $Y_i$ where "i" ranges from 0 to 15 also corresponding to discrete values of intake manifold pressure Pm. For engine speeds 1000 rpm or less the speed value increases with an increment of 100 rpm to correspond with columns $X_0$ to $X_5$, and for engine speeds 1500 rpm or greater the speed value increases with an increment of 500 rpm to correspond with columns $X_6$ to $X_{15}$. On the other hand, the pressure value increases with an equal amount of increment through a range from 85 mmHg to 760 mmHg. Each of the advance angle data Tmap is stored at the intersection of the associated column and row and serves as a basic data from which the reference advance angle data $\theta_{map}$ will be derived by interpolation. This $T_{map}$ data will be corrected by an amount $\Delta T$ during the basic ignition phase which occurs subsequent to the retard ignition phase of a previous feedback cycle which comprises basic, advance and retard ignition phases.

Figure 20:
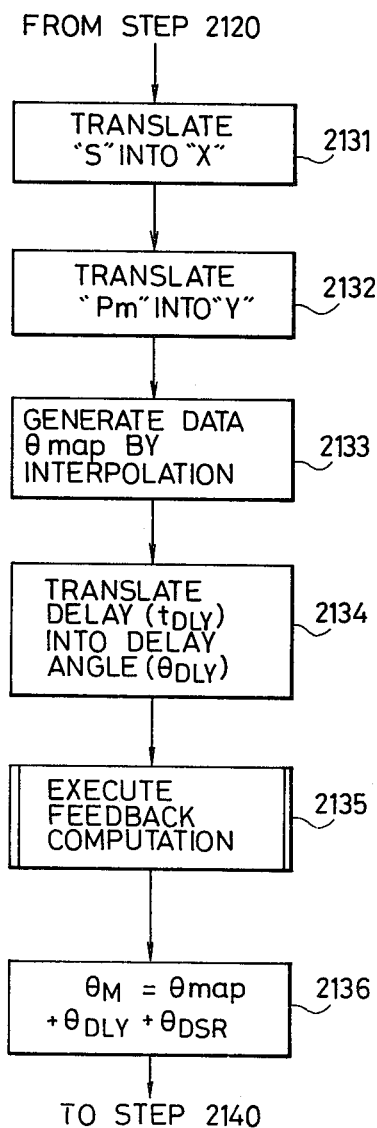
FIGS. 20–23 are an illustration of a flowchart describing the process of seeking the optimum ignition angle.

Referring to FIG. 20, the control shifts from step 2120 to 2131 in which the engine rpm S is converted into a corresponding value of X in accordance with the following Equations:

$$X = 0, \text{ if } S < 500 \text{ rpm} \qquad (8)$$
$$X = X_i + \Delta X \qquad (9)$$
$$\text{where, } \Delta X = (S - S_{xi})/(S_{xi+1} - S_{xi}), \text{ where } S_{xi} \leq S < S_{xi+1}, \qquad (10)$$
$$X = 15, \text{ if } S \geq 6000 \text{ rpm}$$

where $S_{xi}$ is a maximum value of the discrete rpm values which are smaller than S, and $X_i$ is a column number corresponding to $S_{xi}$.

In step 2132, the detected intake manifold pressure Pm is converted into a corresponding value of Y in accordance with the following Equations:

$$Y = 0, \text{ if } Pm < 85 \text{ mmHg} \qquad (11)$$
$$Y = Y_i + \Delta Y \qquad (12)$$
$$\text{where, } \Delta Y = (Pm - Pm_{yi})/(Pm_{yi+1} - Pm_{yi}), \text{ where } Pm_{yi} \leq Pm < Pm_{yi+1}. \qquad (13)$$
$$Y = 15, \text{ if } Pm \geq 760 \text{ mmHg}$$

where, $Pm_{yi}$ is a maximum of the discrete Pm values which are smaller than Pm, and $Y_i$ is a row number corresponding to $Pm_{yi}$.

In step 2133 a set of reference advance angle data $\theta_{map}$ is derived from the $T_{map}$ data by the method of interpolation using four interpolated points in accordance with the following Equation:

$$\theta_{map} = (1 - \Delta X)(1 - \Delta Y)T_{map(X_i,Y_i)} + (1 - \Delta Y)\Delta X \cdot T_{map(X_{i+1},Y_i)} + \Delta Y(1 - \Delta X)T_{map(X_i,Y_{i+1})} + \Delta Y\Delta X \, T_{map(X_{i+1},Y_{i+1})} \qquad (14)$$

In step 2134, the delay time introduced by the ignitor is converted into a corresponding crank angle value $\theta_{DLY}$ which is given as follows:

$$\theta_{DLY} = t_{DLY} \times 180°/Tm \text{ microseconds} \qquad (15)$$

where $t_{DLY}$ is the delay time involved with the ignitor 7.

Figure 21:
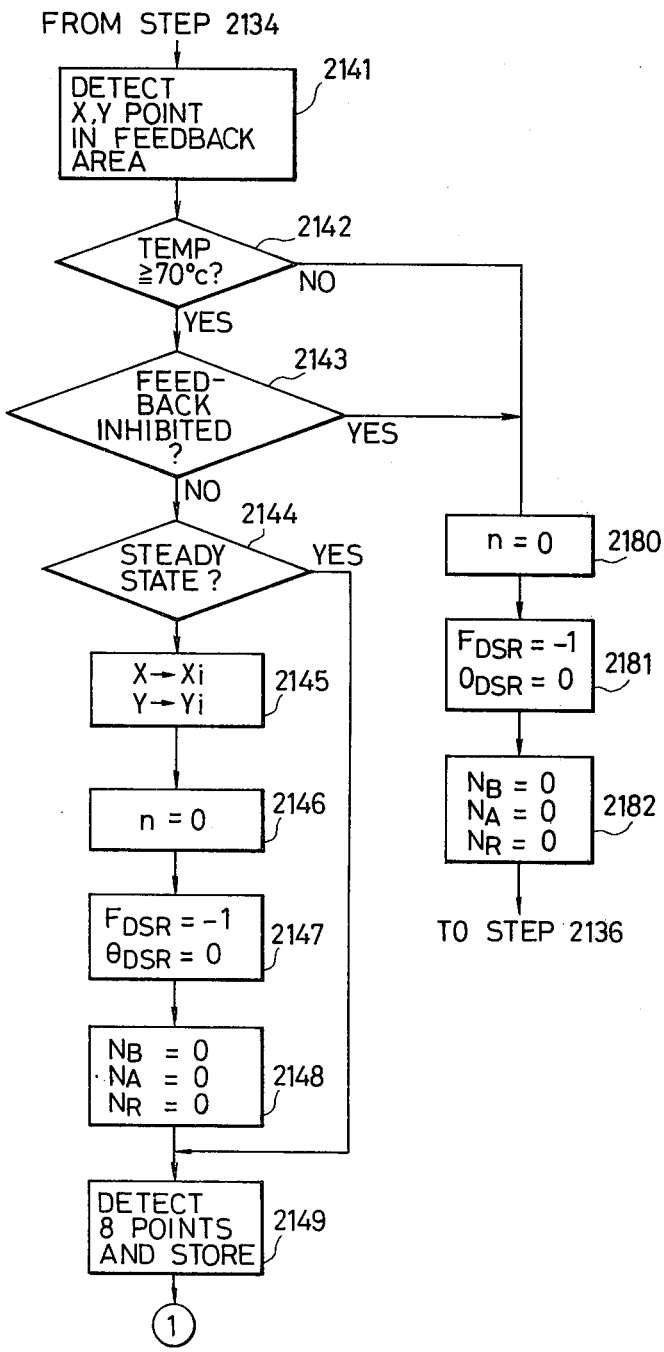
Figure 22:
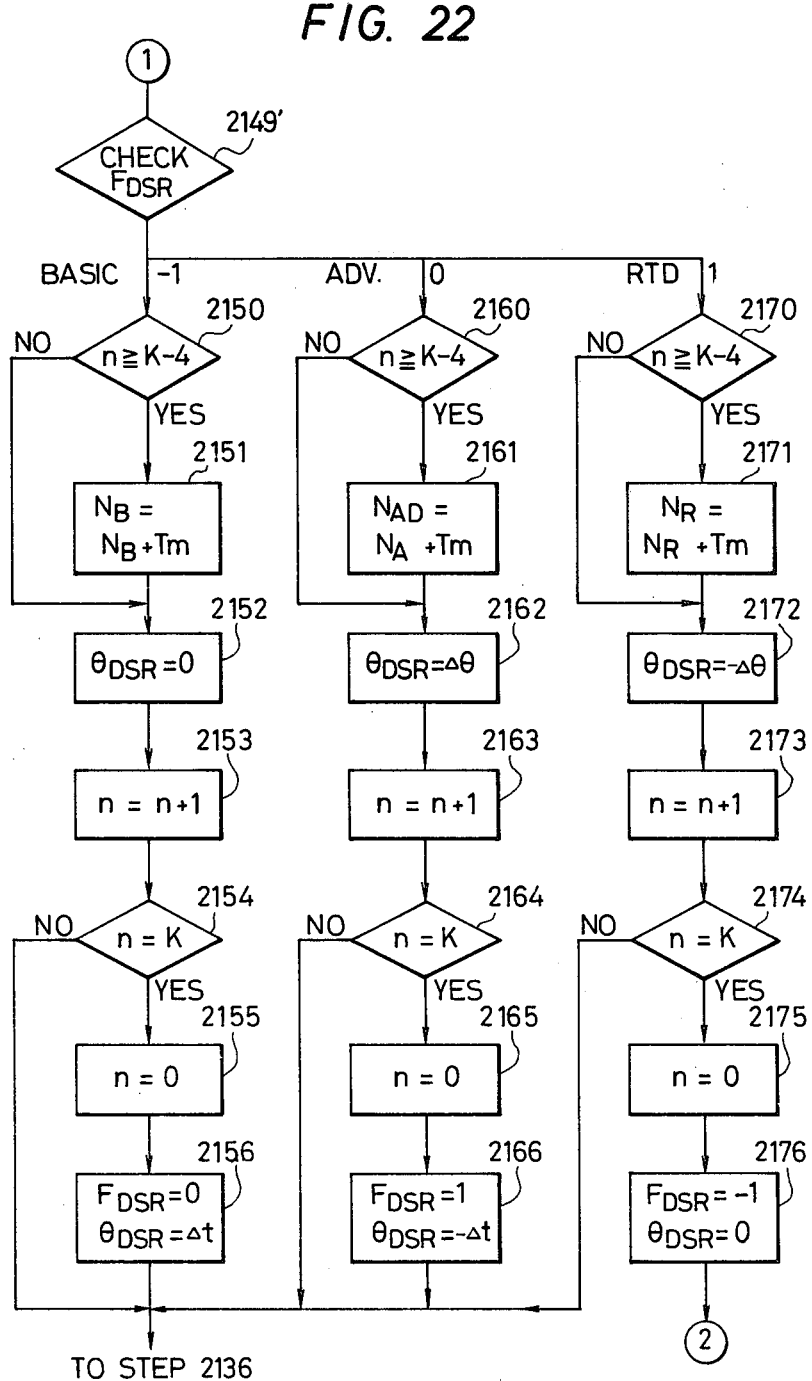
Figure 23:
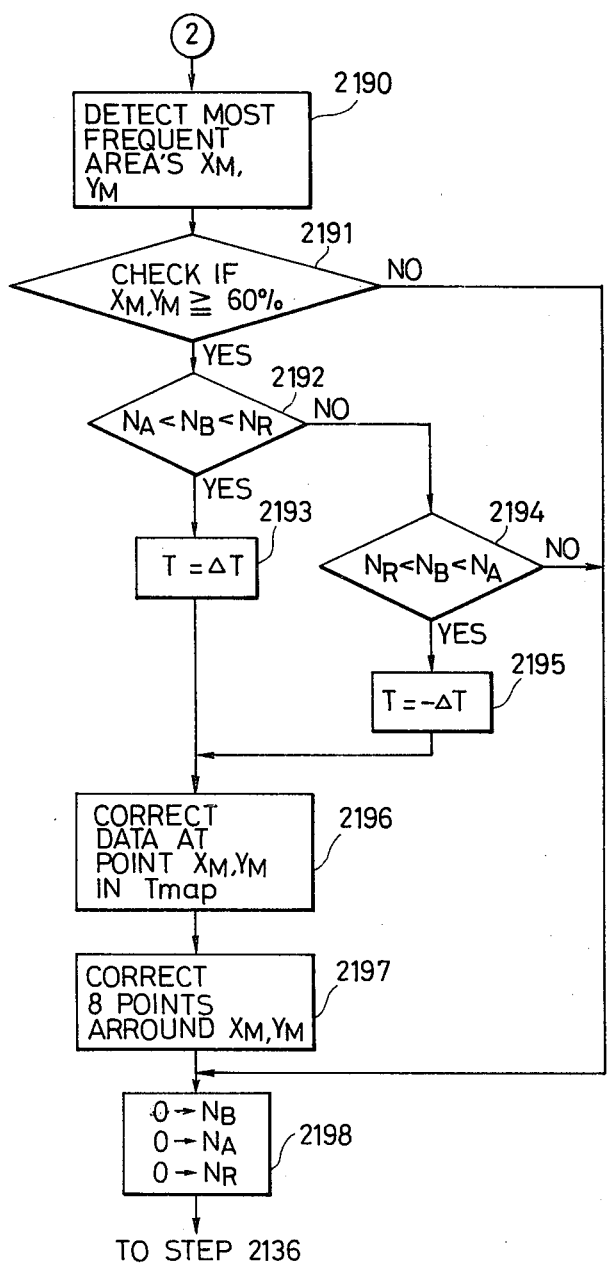
Figure 25:
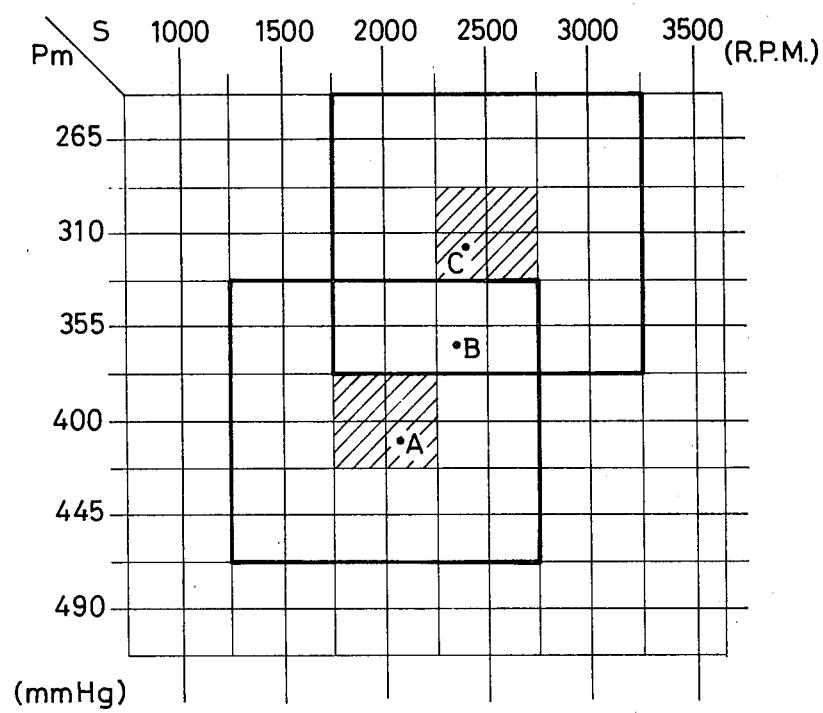
FIG. 25 is an illustration of a part of the random access memory of FIG. 24 showing feedback controlled areas.

In the subsequent step 2135, the CPU 60 provides the computation of feedback correction values $\Delta T$ by dithering or fluctuating the advance angle by a small amount of $\Delta t$ with respect to the basic or reference advance angle $\theta_{map}$. The details of the step 2135 is illustrated in FIG. 21 which involves steps 2141–2149 and steps 2180–2182 and will be described with reference to FIG. 25. FIG. 25 is an illustration of a part of the $T_{map}$ data of FIG. 24 in which feedback-controlled areas are defined by thick-line rectangles each surrounding a hatched rectangle area. Control is such that if a data point at A is shifted to a point B within the same rectangular area defined by the thick line in response to changing engine conditions, the engine operation is regarded as steady state or cruising, and if the point A is shifted to a point C outside of the rectangle, the engine operation is regarded as nonsteady state and a new feedback-controlled area is defined around the point C. For example, when the engine is operated at 2000 rpm with intake manifold pressure at 400 mmHg, the feedback-controlled area spans from 1750 rpm to 2250 rpm and from 377.5 mmHg to 422.5 mmHg, and the controlled area is identified by eight points spaced at equal intervals along the sides of the rectangle. When the point A is shifted to the point C and a new controlled area is defined, the latter is used to initialize a set of data which permits the CPU to regard the new controlled area as a new steady state area for subsequent engine operations.

Figure 26:
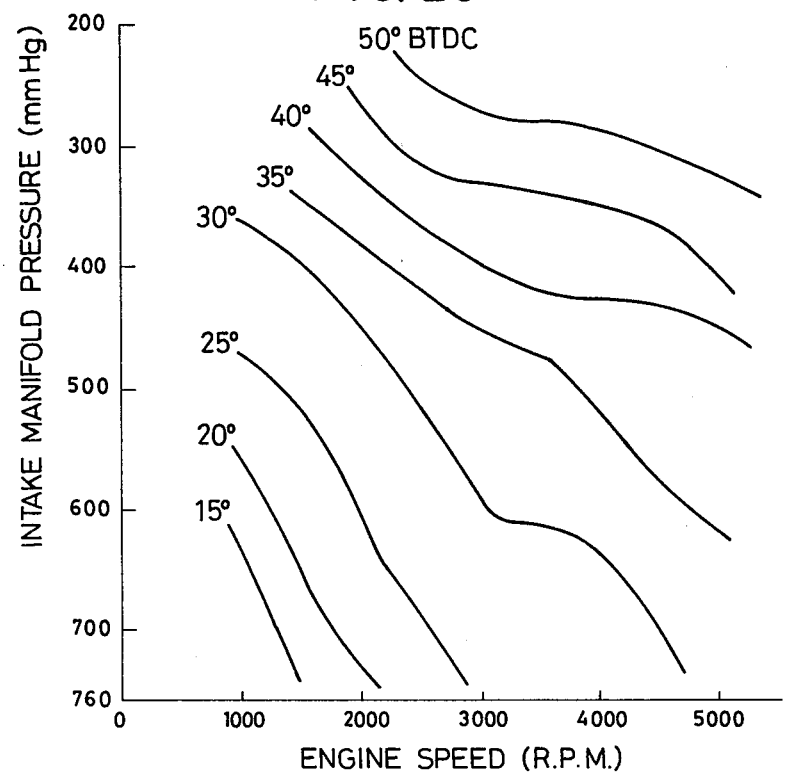
FIG. 26 is a graphic illustration of the relation between engine speed and intake manifold pressure with spark ignition angle (BTDC) as a parameter.
Figure 27:
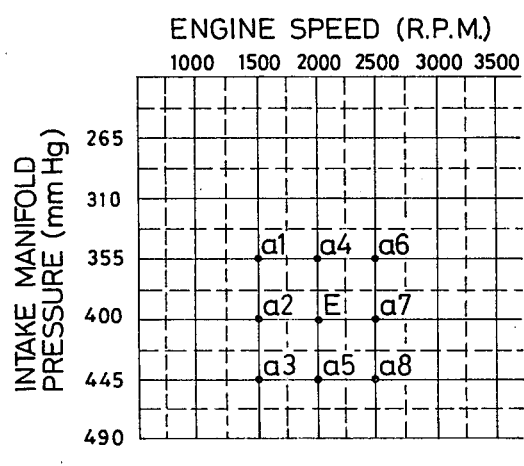
FIG. 27 is a schematic illustration of a plurality of data points selected around a center data point.

During each feedback control cycle the steady state area may vary from instant to instant and the most frequently occurred area is detected in order to correct the $T_{map}$ advance angles at the eight points just described above toward the advance or retard side of the MBT in response to the detected clock count values if the most frequently occurred area acounts for more than 60 percent of the total during one feedback cycle. As shown in FIG. 26, the optimum advance angle $\theta_M$ varies as a function of engine rpm and intake manifold pressure and a representative center point E with the associated eight points a1 to a8, shown in FIG. 27, are corrected in accordance with the following Equations:

$$\left.\begin{array}{l}\text{Point } E: \Delta T \\ \text{Point } a_1: \Delta T_1 = 0.15 \times \Delta T \\ \text{Point } a_2: \Delta T_2 = 0.10 \times \Delta T \\ \text{Point } a_3: \Delta T_3 = 0.05 \times \Delta T \\ \text{Point } a_4: \Delta T_4 = 0.20 \times \Delta T \\ \text{Point } a_5: \Delta T_5 = 0.10 \times \Delta T \\ \text{Point } a_6: \Delta T_6 = 0.40 \times \Delta T \\ \text{Point } a_7: \Delta T_7 = 0.20 \times \Delta T \\ \text{Point } a_8: \Delta T_8 = 0.15 \times \Delta T \end{array}\right\} \qquad (16)$$

The feedback controlled correction is inhibited when the engine is idled to prevent misfire which would otherwise occur if ignition is allowed to occur at the optimum advance, or when the engine is run at heavy load to prevent undesirable knocking. For this purpose, an inhibit data map is prepared by storing "0" bits in a memory similar to that shown in FIG. 24 to define an area of feedback control and "1" bits to define an area of feedback inhibit.

Referring to FIG. 21, the step 2141 now takes control to detect the column number X corresponding to the detected instantaneous rpm value S and the row number Y corresponding to the detected instantaneous intake pressure value Pm by consulting the $T_{map}$ data of FIG. 24. In step 2142 the CPU decides whether the engine coolant temperature is above or below a preset point of 70° C. This coolant temperature is detected in step 4200 during the main routine which will be described later. If the coolant temperature is above the preset point, the CPU proceeds to step 2143 to determine whether the area corresponding to the X, Y numbers detected in step 2141 falls within the feedback control area of the inhibit data map, and if so, the control shifts to step 2144 in which the CPU determines whether the X, Y point of step 2141 falls within the feedback control area by consulting the $T_{map}$ of FIG. 24. If that point falls within the feedback controlled area, the engine condition is recognized as a steady state and the control advances to step 2149. If the X,Y point falls outside of the controlled area, nonsteady state is detected, and steps 2145 to 2148 successively take control to initialize data. In step 2145, $X_i$ and $Y_i$ are placed in storage in substitution for the X and Y values. In step 2146, the ignition counter is reset to zero and n=0 is placed in the ignition count register. In step 2147 dither flag $F_{DSR}$ is set equal to "−1" and dither advance angle $\theta_{DSR}$ is set equal to "0", and in step 2148 the contents of the clock counters $N_B$, $N_A$ and $N_R$ are altered to "0", which is then followed by the step 2149.

If the coolant temperature is below the preset point or if the area corresponding to the detected X, Y point falls within the inhibit area of the feedback inhibit data map. control proceeds to steps 2180 to 2182 to initialize data as in steps 2146 to 2148, and proceeds to step 2136 (FIG. 20).

In step 2149, the $T_{map}$ of FIG. 24 is consulted to detect eight points surrounding the point $X_i,Y_i$ and place them in storage for later use in step 2190 to permit determination of the most frequently occurred feedback controlled area during a feedback cycle. The counted eight points include $(X_{i-1}, Y_{i-1})$, $(X_{i-1}, Y_i)$, $(X_{i-1}, Y_{i+1})$, $(X_i, Y_{i-1})$, $(X_i, Y_{i+1})$, $(X_{i+1}, Y_{i-1})$, $(X_{i+1}, Y_i)$ and $(X_{i+1}, Y_{i+1})$.

The step 2149 is subsequently followed by step 2149' (FIG. 22) to determine which ignition phase is to be followed by interrogating the content of dither flag $F_{DSR}$. If $F_{DSR}=-1$ is detected, this is an indication that basic or reference advance ignition is to be performed, so that the procedures in steps 2150 to 2156 are successively performed. $F_{DSR}=0$ and $F_{DSR}=1$ respectively indicate ignition dither advance and ignition dither retard.

Figure 28:
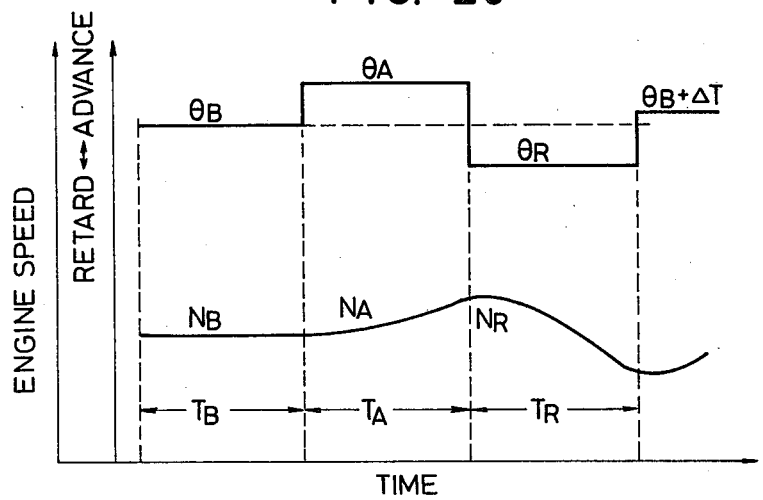
FIG. 28 is a graphic illustration of an engine speed versus time characteristic associated with the flowcharts of FIGS. 20–23.
Figure 29:
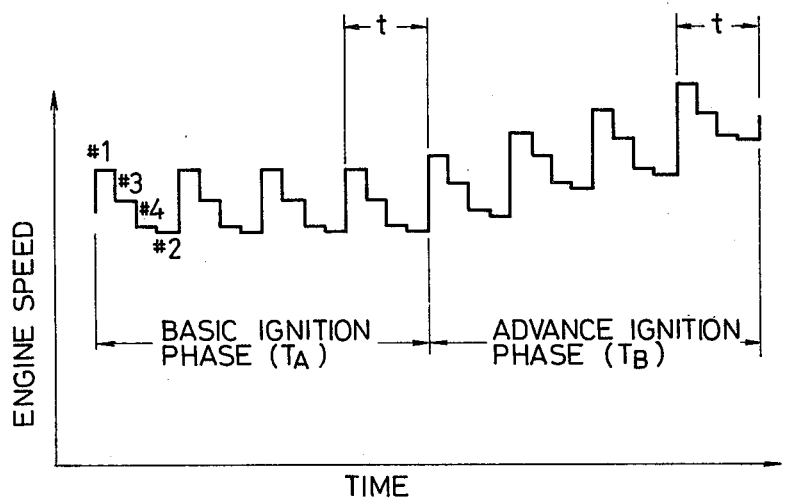
FIG. 29 is a graphic illustration of the variation of engine speed in response to successive combustions of a multiple cylinder internal combustion engine.

In this embodiment, the k value is selected to have any of integers 40 to 60, and since, as previously described, ignition occurs repeatedly k times during each of the basic, advance and retard phases ($T_B$, $T_A$, $T_R$), the engine speed tends to vary significantly as shown in FIG. 28. It is thus appreciated that each of the engine speed clock count values $N_B$, $N_A$ and $N_R$ is preferably determined by the clock pulses which occur during a short period immediately prior to the occurrence of a transition from one ignition phase to another, rather than by the clock pulses which occur during the full length of each ignition phase. This assures smooth variation of engine speed when the spark advance angle is dithered by discrete amounts. This short interval is preferably "m" times the ignition intervals of all the cylinders, where "m" is an integer including unity, since crankshaft revolution speed tends to vary as shown in FIG. 29 depending on the operating characteristic of the individual cylinders. Therefore, the engine speed detected during this short interval so selected as just described is representative of an average value for a period "t" (FIG. 29). In the present embodiment, m=1 is selected so that the engine speed determining period equals four ignition intervals.

In step 2150 the content of an ignition counter is interrogated to determine whether the count value "n" is equal to or greater than k−4, and if so, the control shifts to step 2151 where the basic count value $N_B$ is set equal to $T_m+N_B$, the latter representing crankshaft speed during the four-ignition interval, and then proceeds to step 2152. If the value "n" is smaller than k−4, the step 2151 is skipped and the step 2152 is performed to set the dither angle $\theta_{DSR}$ equal to zero. In step 2153, the count value "n" is set equal to n+1 by incrementing it by "1". Since the program interrupt routine occurs repeatedly, the count value "n" is incremented until n=k is obtained. The event n=k is detected in step 2154 to terminate the basic ignition phase by initializing the count "n" in step 2155 and subsequently setting $F_{DSR}$ to "0" and dither advance angle $\theta_{DSR}$ to $\Delta t$ in step 2156 for later use in subsequent program interrupt routines. If the count value "n" is smaller than k, the steps 2155 and 2156 are skipped and the control proceeds to step 2136 to determine the optimum advance angle $\theta_M$ by setting it equal to $\theta_{map}+\theta_{DLY}+\theta_{DSR}$. The optimum advance angle $\theta_M$ is utilized in step 2140 (FIG. 19) to derive ignition data, thus completing one program interrupt routine. Program interrupt routines for the basic ignition phase are repeated until the count value "n" becomes equal to k, so that ignition occurs k times during the basic ignition phase at the reference advance angle $\theta_{map}+\theta_{DLY}$.

In a subsequent program interrupt, $F_{DSR}=0$ is detected in step 2149' to permit the control to proceed to steps 2160 to 2166 which are similar to the steps 2150 to 2156 with the exception that in step 2162 the dither angle $\theta_{DSR}$ is set to $\Delta\theta$ and in step 2166 the dither flag $F_{DSR}$ is set equal to "1" and $\theta_{DSR}$ to $-\Delta t$. The advance ignition phase is thus performed in a similar manner to that of the basic ignition phase to set the clock count value $N_A$ equal to $T_m+N_A$, where the latter represents the crankshaft speed during the four ignition intervals prior to the occurrence of a transition to the subsequent retard ignition phase.

The data $F_{DSR}=1$ which is set in the step 2166 causes the control to steer to a step 2170 in a subsequent program interrupt so that the events specified in steps 2170 to 2176 are successively executed in a similar manner to those described with reference to the basic and advance ignition phases with the exception that in step 2172 the dither angle $\theta_{DSR}$ is set to $-\Delta\theta$ and in step 2176 the dither flag $F_{DSR}$ is set to $-1$ and $\theta_{DSR}$ to 0 to cause the CPU to repeat the above process. Thus, in step 2171 the clock count value $N_R$ is set to $T_m+N_R$, where the latter represents the crankshaft speed during the four ignition intervals prior to the occurrence of a transition to a subsequent basic ignition phase.

The CPU 60 now proceeds to step 2190 (FIG. 23) in which the data stored in step 2149 is interrogated to determine the most frequently occurred feedback controlled area during a feedback cycle comprising the basic, advance and retard ignition phases and the corresponding column number $X_M$ and row number $Y_M$ are placed in storage. In a subsequent step 2191 the CPU determines whether the number of occurrences of the data $X_M$ and $Y_M$ accounts for more than 60 percent of the total number of ignitions which have occurred in a feedback cycle, and if less than 60 percent, the control goes to step 2198 to reset the clock count values $N_B$, $N_A$ and $N_R$ to zero, and thence to the step 2136, and if more than 60 percent, the control goes to step 2192.

In the step 2192, the clock count values $N_A$, $N_B$ and $N_R$ are interrogated to determine their relative values in the same manner as provided in the step 430 (FIG. 2) of the previous embodiment. If the relation $N_A < N_B < N_R$ is detected in step 2192, angle correction data T is updated by setting it equal to $\Delta T$ in a step 2193, and if this relation is not detected, step 2194 is executed by detecting if relation $N_R < N_B < N_A$ exists in the same manner as in the step 431 of the previous embodiment. If the latter relation is detected, step 2195 is executed by setting the correction advance data T equal to $-\Delta T$, and if not detected, the clock counts are set equal to zero in step 2198.

In step 2196 the $T_{map}$ data is altered so that the values $X_M$ and $Y_M$ are corrected by an amount $\Delta T$ or $-\Delta T$ depending on whether the control has passed through the step 2193 or 2195. In step 2197 the eight points surrounding the data point $X_M, Y_M$ are corrected in accordance with Equation 16. The control then proceeds to step 2198 completing the MBT feedback step 2135 and proceeds to step 2136, which is followed by step 2140 (FIG. 19).

In the step 2140, the CPU performs the calculus operations on the data $T_{ON}$ which is obtained in an 8-ms interrupt routine (which will be described below) and on the engine speed data S to determine an optimum value for spark current conduction angle. In addition, the CPU computes the current conduction start angle or dewll angle $\theta_{ON}$ based on the optimum current conduction angle and the previously obtained $\theta_M$ and detects a downcount value corresponding to the current conduction start angle as well as a downcount value corresponding to the ignition angle $\theta_M$ to allow the detected downcount values to be utilized in step 1300 which is executed in the crankshaft gear interrupt routine to activate the ignition control unit 68 to generate sparks. The same process as described above is provided during the engine start operation.

Figure 30:
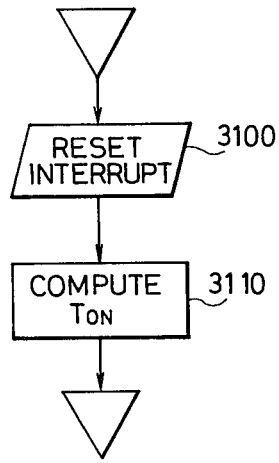
FIG. 30 is an illustration of a flowchart of 8-ms interrupt routine.
Figure 32:
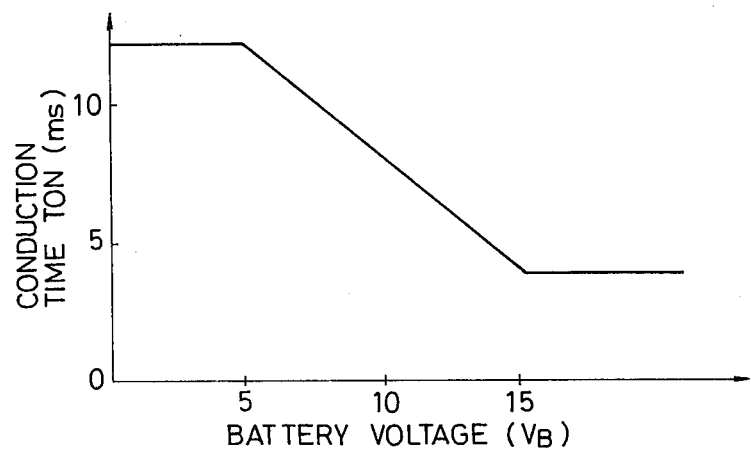
FIG. 32 is a graphic illustration of the spark current condution period as a function of battery voltage.

FIG. 30 illustrates a flowchart of the 8-ms interrupt routine. In step 3100 a reset pulse is applied to the terminal 443 of the interrupt control unit 61 (FIG. 9) to reset the flip-flop 300 to generate an 8-ms interrupt request signal on terminal 446. In step 3110 the CPU interrogates the analog input port 65 to read the battery voltage data $V_B$ to determine the current conduction period $T_{ON}$ in proportion to the voltage curve of FIG. 32.

Figure 31:
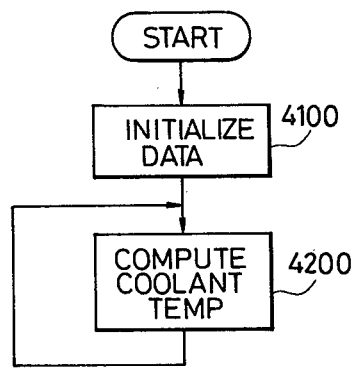
FIG. 31 is an illustration of a flowchart of main routine.

The main routine is illustrated in the flowchart of FIG. 31. In step 4100 the CPU provides data initialization by clearing the RAM 70, receiving various input parameter data and issueing interrupt requests, and in step 4200 the CPU derives digitally converted coolant temperature data. This main routine is constantly executed in the absence of any interrupt routines.

What is claimed is:

1. A method of operating a powerproducing machine at maximum output torque under varying operating conditions, said machine having an adjustable input machine variable the setting of which controls the output torque, said method comprising:

oscillating the setting of the input variable by a predetermined amount with respect to a variable reference setting;

sensing an output variable representative of said output torque during at least three successive phases of the oscillation;

sensing whether the detected output variables establish one of first and second sequential relationships of a plurality of possible sequential relationships indicating that said variable reference setting is on one of a first and second sides, respectively, of an optimum position; and adjusting said variable reference setting toward said optimum position exclusively in response to one of the sensed first and second sequential relationships.

2. The method of claim 1, wherein said step of oscillating the setting of the input variable comprises varying the input variable at least three settings in successive phases of a recurrent cycle.

3. The method of claim 2, wherein said step of sensing the variable comprises sensing during a short interval immediately prior to a transition from one phase to another of said recurrent cycle.

4. A method of operating an internal combustion engine at maximum output torque under varying operating conditions, said engine having an output shaft and an adjustable input engine variable the setting of which controls the output torque, the method comprising:

oscillating the setting of the input variable by a predetermined amount with respect to a variable reference setting;

sensing an output variable representative of said output torque during at least three successive phases of the oscillation;

sensing whether the detected output variables establish one of first and second sequential relationships of a plurality of possible sequential relationships indicating that said variable reference is on one of a first and second sides, respectively, of an optimum position; and adjusting said variable reference setting toward said optimum position exclusively in response to one of the sensed first and second sequential relationships.

5. The method of claim 4, wherein said step of oscillating the setting of the input variable comprises varying the input variable at least three settings in successive phases of a recurrent cycle.

6. The method of claim 5, wherein said step of sensing the output variable comprises sensing during a short interval immediately prior to a transition from one phase to another of said recurrent cycle.

7. The method of claim 6, wherein said internal combustion engine is of a multiple cylinder type, and wherein said interval is an integral multiple of the time required to complete a combustion in each of the cylinders, said integral multiple being an integral multiple of the number of said cylinders.

8. The method of claim 4, 5, 6 or 7, wherein said input engine variable is representative of a spark ignition advance angle with respect to the top dead center of each cylinder.

9. The method of claim 8, wherein said output variable is representative of the speed of revolution of said output shaft.

10. A method of operating an internal combustion engine at maximum output torque under varying operating conditions, said engine having an output shaft and an adjustable spark ignition variable the setting of which controls the output torque, said method comprising the steps of:

(a) reading a reference spark ignition datum from a memory;

(b) repeatedly causing ignitions to occur a predetermined number of times at a reference timing based on the datum read from said memory;

(c) storing a datum representative of the speed of revolution of said output shaft during an interval in which said ignitions occurred;

(d) generating an advance spark ignition datum representing an ignition timing which is advanced with respect to said reference timing by a predetermined amount;

(e) repeatedly causing ignitions to occur at advanced timing said predetermined number of times in accordance with said advance ignition datum generated in the step (d);

(f) storing a datum representative of the speed of revolution of said output shaft during an interval in which said ignitions occurred at said advanced ignition timing;

(g) generating a retard spark ignition datum representing an ignition timing which is retarded with respect to said reference timing by a predetermined amount;

(h) repeatedly causing ignitions to occur at retarded timing said predetermined number of times in accordance with said retard spark ignition datum generated in the step (g);

(i) storing a datum representative of the speed of revolution of said output shaft during an interval in which the ignitions occurred at said retarded timing;

(j) comparing the data stored in the steps (c), (f) and (i) with each other to detect whether said compared data establish one of first and second sequential relationships of a plurality of possible sequential relationships indicating that said reference timing is on one of the advance and retard sides, respectively, of an optimum position;

(k) varying said reference spark ignition datum of the step (a) in a first direction only when said first sequential relationship is detected and in a second direction only when said second sequential relationship is detected; and (l) repeating the steps (a) to (k).

11. The method of claim 10, wherein the step (a) comprises:

(A) generating a first signal representative of the speed of the revolution of said output shaft;

(B) generating a second signal representative of the speed of revolution of said output shaft; and (C) reading a datum representative of a reference advance angle as a function of said first and second signals from said memory.

12. The method of claim 10 or 11, wherein said internal combustion engine is of a multiple cylinder type, and wherein the interval of the step (c) is equal to an integral multiple of the time required to complete a combustion in each of the cylinders, said integral multiple bieng an integral multiple of the number of said cylinders.

13. The method of claim 12, wherein each of the steps (c), (f) and (i) comprises the steps of:

detecting whether the number of occurrences of ignitions is equal to "k−m", wherein "k" is said predetermined number, and "m" is an integral multiple of the number of said cylinders;

counting clock pulses;

detecting whether the number of occurrences of ignitions is equal to "k";

terminating the counting of clock pulses; and storing the clock count in a memory to represent the speed of revolution of the output shaft.

14. The method of claim 11, further comprising the steps of:

defining a feedback control area surrounding the data stored in said memory;

detecting whether an optimum advance angle datum generated subsequently to the step (C) falls outside of said defined feedback control area; and initializing the data stored in the steps (c), (f) and (i) when said subsequently generated datum is detected as falling outside said feedback control area.

15. The method of claim 11, further comprising the steps of:

counting the number of occurrences of said feedback control area;

detecting whether the counted number is below a predetermined value; and initializing the data stored in the steps (c), (f) and (i) when said counted number is detected as being below said predetermined value.

16. A control system for operating a power-producing machine at maximum output torque under varying operating conditions, said machine having an adjustable input machine variable means the setting of which controls the output torque, comprising:

processing means for oscillating the setting of the adjustable input machine variable means by a predetermined amount with respect to a variable reference setting; and means for sensing an output machine variable representative of said output torque during at least three successive phases of the oscillation;

said processing means detecting whether the detected output variables establish one of first and second sequential relationships of a plurality of possible sequential relationships indicating that said variable reference setting is on one of a first and second sides, respectively, of an optimum position; and said processing means adjusting said variable reference setting toward said optimum position exclusively in response to one of the detected first and second sequential relationships.

17. A control system as claimed in claim 16, wherein said oscillations of said processing means includes varying the input machine variable at least three settings in successive phases of a recurrent cycle.

18. A control system as claimed in claim 17, wherein said means for sensing an output machine variable comprises means for sensing said output variable during a short interval immediately prior to a transition from one phase to another of said recurrent cycle.

19. A control system for operating an internal combustion engine at maximum output torque under varying operating conditions, said engine having an output shaft and an adjustable input engine variable means the setting of which controls the output torque, comprising:

processing means for oscillating the setting of the adjustable input engine variable means by a predetermined amount with respect to a variable reference setting; and means for sensing an output engine variable representative of said output torque during at least three successive phases of said oscillation;

said processing means detecting whether said sensed output engine variables establish one of first and second sequential relationships of a plurality of possible sequential relationships indicating that said variable reference setting is on one of a first and second sides, respectively, of an optimum position; and said processing means adjusting said variable reference setting toward said optimum position exclusively in response to one of the detected first and second sequential relationships.

20. A control system for operating an internal combustion engine at maximum output torque under varying operating conditions, said engine having an output shaft and an adjustable spark ignition advance timing means the setting of which controls the output torque, comprising:

a random access memory;

means for generating a speed signal related to the speed of revolution of said output shaft;

means for sensing the intake air pressure of said engine; and a microcomputer programmed to perform the following steps:

(a) storing in said random access memory a set of reference ignition setting data as a function of said speed signal and as a function of the sensed intake air pressure;

(b) selectively reading a datum from said random access memory at periodic intervals in response to said speed signal and intake air pressure;

(c) oscillating the setting of said spark ignition timing means by a predetermined amount with respect to the setting of said datum read out of said memory;

(d) successively storing data representative of said speed signal during at least three successive phases of the oscillation in said memory;

(e) detecting when said stored speed representative data establish one of first and second sequential relationships of a plurality of possible sequential relationships indicating that the setting of said ignition timing means is on one of the advance and retard sides, respectively, of an optimum position; and (f) correcting said stored reference ignition setting data by a predetermined amount in one of a first and second directions exclusively in response to one of said detected first and second relationships.

21. A control system as claimed in claim 20, wherein said random access memory is of a nonvolatile type.

22. A control system as claimed in claim 20, including means for generating an angular position pulse in response to said output shaft rotating through a predetermined angle, and wherein the step (b) comprises the steps of:

generating clock pulses at a frequency higher than the highest frequency of said angular position pulse;

counting said clock pulses in response to said angular position pulse to determine the instantaneous angular position of said output shaft with respect to the position of said predetermined angle; and addressing said random access memory in accordance with said determined instantaneous angular position.

23. A control system as claimed in claim 20, further comprising a d.c. power source, an engine starter energized by said d.c. power source when said engine is being started, and means for sensing the voltage of said d.c. power source, and wherein said ignition advance timing steps of said microcomputer cooperate with an ignition coil and means for flowing a current into said ignition coil for a variable length of time as a function of said sensed voltage of said d.c. power source.

* * * * *